US011382101B1

(12) United States Patent
Chu et al.

(10) Patent No.: US 11,382,101 B1
(45) Date of Patent: Jul. 5, 2022

(54) BANDWIDTH INDICATION, NEGOTIATION AND TXOP PROTECTION WITH MULTIPLE CHANNEL SEGMENTS

(71) Applicant: Marvell Asia Pte, Ltd., Singapore (SG)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 149 days.

(21) Appl. No.: 16/830,146

(22) Filed: Mar. 25, 2020

Related U.S. Application Data

(60) Provisional application No. 62/870,437, filed on Jul. 3, 2019, provisional application No. 62/831,596, filed on Apr. 9, 2019, provisional application No. 62/823,504, filed on Mar. 25, 2019.

(51) Int. Cl.
*H04W 72/04* (2009.01)
*H04L 5/00* (2006.01)
*H04L 27/26* (2006.01)
*H04W 74/00* (2009.01)
*H04W 74/08* (2009.01)
*H04W 84/12* (2009.01)
*H04L 101/622* (2022.01)
(Continued)

(52) U.S. Cl.
CPC ......... *H04W 72/0453* (2013.01); *H04L 5/001* (2013.01); *H04L 5/0094* (2013.01); *H04L 27/2608* (2013.01); *H04W 74/002* (2013.01); *H04L 1/1614* (2013.01); *H04L 61/6022* (2013.01); *H04L 69/22* (2013.01); *H04W 74/0816* (2013.01); *H04W 84/12* (2013.01)

(58) Field of Classification Search
CPC .. H04L 5/001; H04L 5/0094; H04W 72/0453; H04W 74/002
See application file for complete search history.

(56) References Cited

U.S. PATENT DOCUMENTS

2006/0203841 A1* 9/2006 Fischer .................. H04L 69/18
370/461
2015/0131517 A1* 5/2015 Chu ..................... H04W 72/005
370/312
(Continued)

OTHER PUBLICATIONS

IEEE P802.11 ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

(Continued)

*Primary Examiner* — Kevin C. Harper

(57) ABSTRACT

A communication device generates a first packet to include a first indication of one or more first frequency subchannels in a first frequency segment that will be utilized to transmit the first packet. The communication device also generates a second packet to include a second indication of one or more second frequency subchannels in a second frequency segment that will be utilized to transmit the second packet. The communication device simultaneously transmits the first packet via the first frequency segment and the second packet via the second frequency segment.

16 Claims, 14 Drawing Sheets

(51) Int. Cl.
*H04L 1/16* (2006.01)
*H04L 69/22* (2022.01)

(56) References Cited

U.S. PATENT DOCUMENTS

| | | | |
|---|---|---|---|
| 2016/0081075 A1* | 3/2016 | Kim | H04B 7/0619 |
| | | | 370/329 |
| 2016/0105535 A1* | 4/2016 | Kenney | H04W 84/12 |
| | | | 370/329 |
| 2017/0041171 A1* | 2/2017 | Li | H04L 5/0053 |
| 2017/0071014 A1* | 3/2017 | Seok | H04W 74/006 |
| 2019/0123863 A1 | 4/2019 | Zhang et al. | |
| 2019/0182714 A1 | 6/2019 | Chu et al. | |
| 2019/0182863 A1 | 6/2019 | Chu et al. | |
| 2019/0349930 A1 | 11/2019 | Chu et al. | |

OTHER PUBLICATIONS

IEEE P802.11 ax™/D5.0, "Draft Standard for Information technology - Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE Std 802.11-REVmc™/D8.0 (revision of IEEE Std. 802.11™—2012) "Draft Standard for Information technology—Telecommunications and information exchange between systems—Local and metropolitan area network—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

U.S. Appl. No. 16/827,495, Chu et al., "Allocating Resource Units for Multi-User Transmissions in Wide Bandwidths," filed Mar. 23, 2020.

U.S. Appl. No. 16/847,326, Chu et al., "Allocating Resource Units for Uplink Mulit-User Transmissions in Wide Bandwidths," filed Apr. 13, 2020.

\* cited by examiner

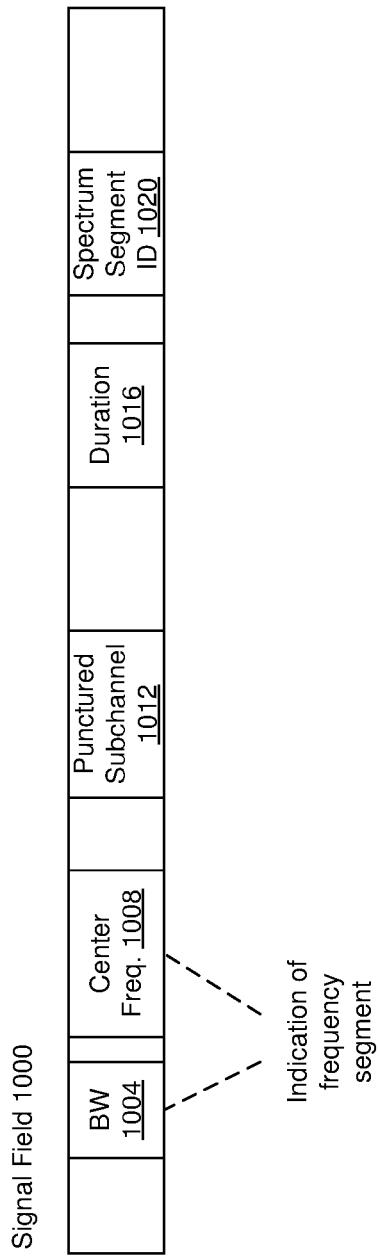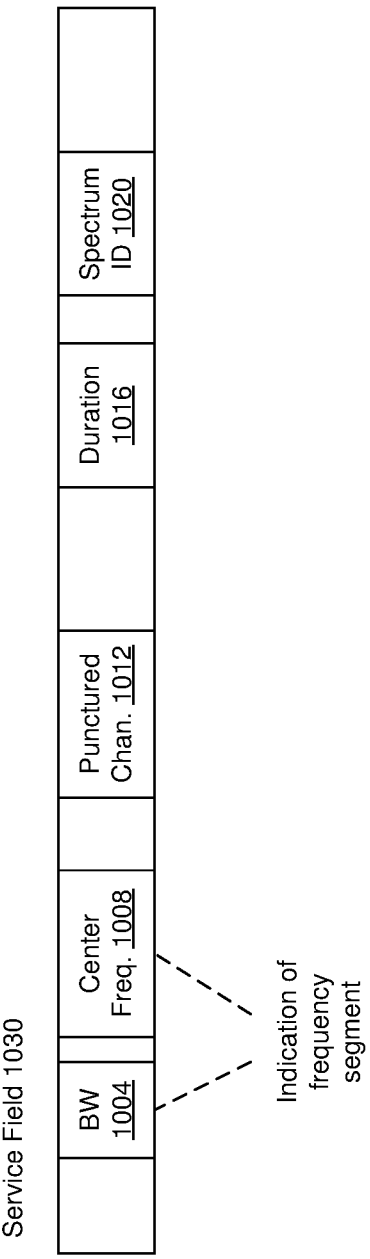

BANDWIDTH INDICATION, NEGOTIATION AND TXOP PROTECTION WITH MULTIPLE CHANNEL SEGMENTS

CROSS REFERENCES TO RELATED APPLICATIONS

This application claims the benefit of U.S. Provisional Patent Application No. 62/823,504, entitled "Basic Service Set (BSS) with Multiple Channel Segments or >160 MHz BW: —BW Indication, Negotiation and TXOP Protection," filed on Mar. 25, 2019, U.S. Provisional Patent Application No. 62/831,596, entitled "Basic Service Set (BSS) with Multiple Channel Segments or >160 MHz BW: —BW Indication, Negotiation and TXOP Protection," filed on Apr. 9, 2019, U.S. Provisional Patent Application No. 62/870,437, entitled "Basic Service Set (BSS) with Multiple Channel Segments or >160 MHz BW: —BW Indication, Negotiation and TXOP Protection," filed on Jul. 3, 2019. All of the applications referenced above are incorporated herein by reference in their entireties.

FIELD OF TECHNOLOGY

The present disclosure relates generally to wireless communication systems, and more particularly to indicating a channel bandwidth, negotiating a channel bandwidth, and protecting a transmit opportunity period (TXOP) for wide bandwidth channels or channels having different frequency segments.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels). Additionally, the IEEE 802.11be Standard may permit aggregation 20 MHz sub-channels in different frequency segments (for example, separated by a gap in frequency) to form a single aggregate channel. Further, the IEEE 802.11be Standard may permit aggregation 20 MHz sub-channels in different radio frequency (RF) bands to form a single aggregate channel.

The current draft of the IEEE 802.11ax Standard (referred to herein as "the IEEE 802.11ax Standard" for simplicity) provides mechanisms for indicating a bandwidth of a transmission within a single RF band, negotiating a channel bandwidth in a single RF band, and protecting a transmit opportunity period (TXOP) for a channel in a single RF band, the channel having a bandwidth up to 160 MHz.

SUMMARY

In an embodiment, a method for simultaneously transmitting in multiple frequency segments in a wireless local area network (WLAN) includes: generating, at a communication device, a first packet to include a first indication of one or more first frequency subchannels in a first frequency segment that will be utilized to transmit the first packet; generating, at the communication device, a second packet to include a second indication of one or more second frequency subchannels in a second frequency segment that will be utilized to transmit the second packet; and simultaneously transmitting, by the communication device, the first packet via the first frequency segment and the second packet via the second frequency segment.

In another embodiment, a communication device comprises: a wireless network interface device having one or more integrated circuit (IC) devices. The one or more IC devices are configured to: generate a first packet to include a first indication of one or more first frequency subchannels in a first frequency segment that will be utilized to transmit the first packet; generate a second packet to include a second indication of one or more second frequency subchannels in a second frequency segment that will be utilized to transmit the second packet; and control the wireless network interface device to simultaneously transmit the first packet via the first frequency segment and the second packet via the second frequency segment.

BRIEF DESCRIPTION OF THE DRAWINGS

FIG. 10A is a diagram of an example signal field of a physical layer (PHY) header of a packet, according to an embodiment.

FIG. 10B is a diagram of an example service field of a packet, according to an embodiment.

DETAILED DESCRIPTION

A next generation wireless local area network (WLAN) protocol (e.g., the IEEE 802.11be Standard, sometimes referred to as the Extremely High Throughput (EHT) WLAN Standard) may permit aggregation of as many as sixteen 20 MHz sub-channels (or perhaps even more) to form 320 MHz aggregate communication channels (or perhaps even wider aggregate communication channels). Additionally, the IEEE 802.11be Standard may permit aggregation 20 MHz sub-channels in different frequency segments (for example, separated by a gap in frequency) to form a single aggregate channel. Further, the IEEE 802.11be Standard may permit aggregation 20 MHz sub-channels in different radio frequency (RF) bands to form a single aggregate channel.

Described herein are various embodiments of techniques for indicating within a transmission a communication channel via which the transmission is being transmitted, negotiating a communication channel, and/or the protecting a transmit opportunity period (TXOP) for a communication channel, for wide bandwidth channels and/or channels having different frequency segments in a same or different RF bands. For example, in some embodiments, one or more first media access control (MAC) layer data units are transmitted in a first frequency segment, and one or more second MAC layer data units are simultaneously transmitted in a second frequency segment. The one or more first MAC layer data units include a first indication of one or more first frequency sub-channels in the first frequency segment that are utilized to transmit the one or more first MAC layer data units, and the one or more second MAC layer data units include a second indication of one or more second frequency sub-channels in the second frequency segment that are used to transmit the one or more second MAC layer data units, according to some embodiments. In various embodiments, the one or more first MAC layer data units are request-to-send (RTS) frames or clear-to-send (CTS) frames that are transmitted as part of a RTS/CTS negotiation of a communication channel and/or to protect a TXOP for a communication channel.

Figure 1:
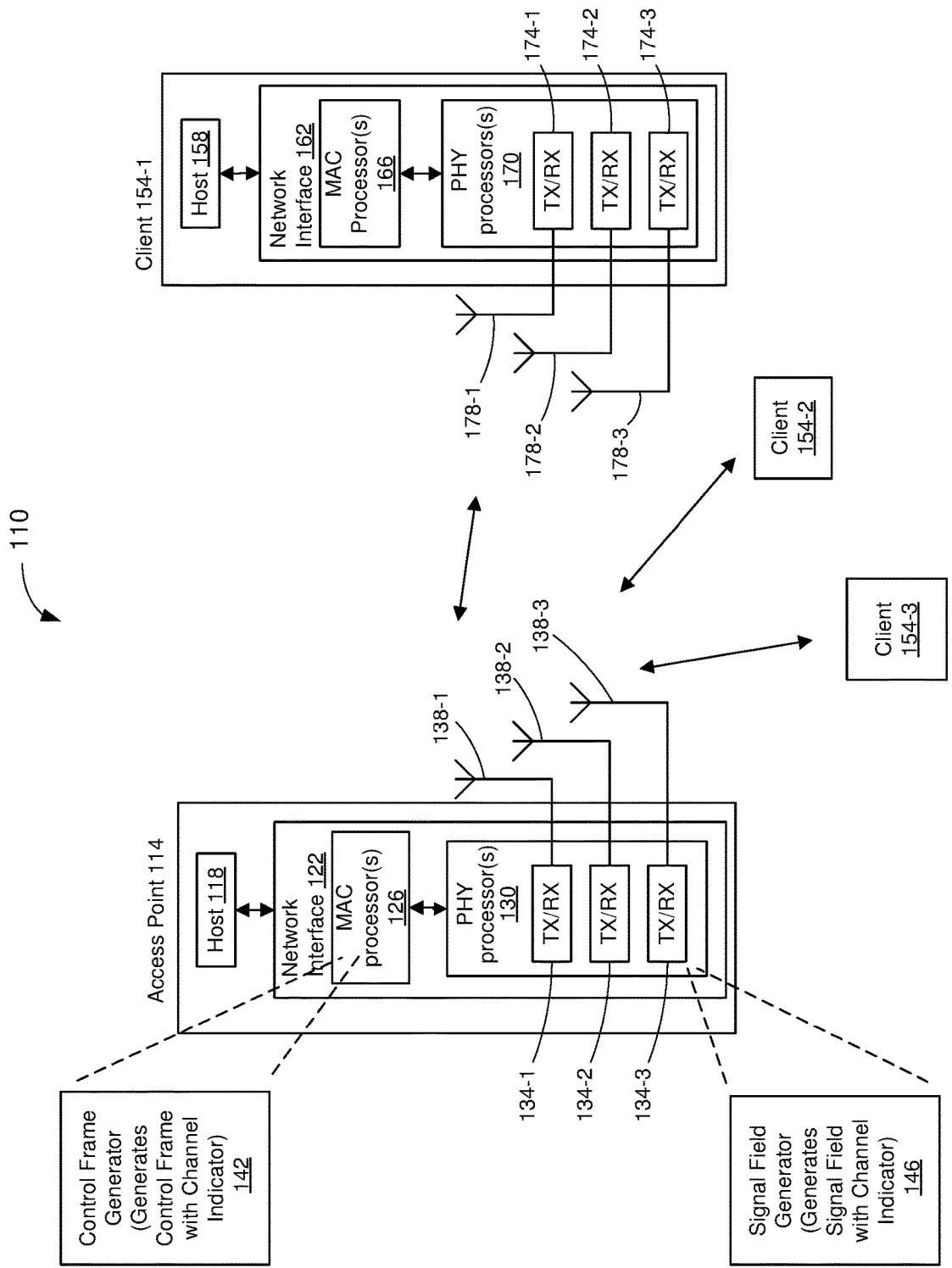
FIG. 1 is a block diagram of an example communication system in which communication devices wirelessly exchange information via communication channels having bandwidths greater than 160 MHz and/or including multiple frequency segments, according to an embodiment.

FIG. 1 is a diagram of an example WLAN 110 that uses communication channels wider than 160 MHz and/or communication channels in multiple frequency segments or in different radio frequency (RF) bands, according to an embodiment. The WLAN 110 includes an access point (AP) 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to transmit and receive via a communication channel that spans a bandwidth greater than 160 MHz, the communication channel within a single RF band. In another embodiment, the wireless network interface device 122 is additionally configured for operation within two or more RF bands at the same time or at different times. For example, in an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands. In an embodiment, the wireless network interface device 122 is configured to transmit and receive via a communication channel that spans a bandwidth greater than 160 MHz, the communication channel spanning multiple RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, a control frame generator 142 that is configured to generate a control frame for negotiating a communication channel with a client station 154 and/or for protecting a TXOP for the communication channel, according to an embodiment. In some embodiments, the control frame is a request-to-send (RTS) frame. In other embodiments, the control frame is a clear-to-send (CTS) frame. In other embodiments, the control frame is another suitable control frame. For communication channels that are greater than 160 MHz and/or that are in multiple frequency segments and/or in multiple RF bands, the control frame generator 142 is configured to generate a first control frame to indicate a first portion of communication channel, such as a portion of the communication channel that is at most 160 MHz and/or within a first frequency segment and/or within a first RF band, wherein the first control frame is to be transmitted within the first portion of the communication channel; and the control frame generator 142 is configured to generate a second control frame to indicate a second portion of communication channel, such as a portion of the communication within a second frequency segment and/or within a second RF band, wherein the second control frame is to be transmitted within the second portion of the communication channel, according to an embodiment. In another embodiment, for communication channels that are greater than 160 MHz and/or that are in multiple frequency segments and/or in multiple RF bands, the control frame generator 142 is configured to generate a control frame to indicate the entire communication channel, wherein the control frame is to be transmitted within the entire communication channel according to an embodiment.

In an embodiment, the control frame generator 142 is implemented by a processor executing machine readable instructions stored in a memory, where the machine readable instructions cause the processor to perform acts described in more detail below. In another embodiment, the control frame generator 142 additionally or alternatively comprises hardware circuitry that is configured to perform acts described in more detail below. In some embodiments, the hardware circuitry comprises one or more hardware state machines that are configured to perform acts described in more detail below.

The PHY processor 130 includes, or implements, a signal field generator 146 that is configured to generate a signal field of a PHY header of a packet, according to some embodiments. For communication channels that are greater than 160 MHz and/or that are in multiple frequency segments and/or in multiple RF bands, the signal field generator 146 is configured to generate a first signal field to indicate a first portion of a communication channel, such as a portion of the communication channel that is at most 160 MHz and/or within a first frequency segment and/or within a first RF band, wherein the first signal field is to be transmitted within the first portion of the communication channel; and the signal field generator 146 is configured to generate a second signal field to indicate a second portion of communication channel, such as a portion of the communication within a second frequency segment and/or within a second RF band, wherein the second signal field is to be transmitted within the second portion of the communication channel, according to an embodiment. In another embodiment, for communication channels that are greater than 160 MHz and/or that are in multiple frequency segments and/or in multiple RF bands, the signal field generator 146 is configured to generate a signal field to indicate the entire communication channel, wherein the signal field is to be transmitted within the entire communication channel.

In some embodiments, when a communication channel that is at most 160 MHz and within one frequency segment (or within one RF band), the signal field generator 146 is configured to generate a signal field that indicates a bandwidth of the communication channel, wherein the signal field is to be transmitted within the entire communication channel.

In an embodiment, the signal field generator 146 comprises hardware circuitry that is configured to perform acts described in more detail below. In some embodiments, the hardware circuitry comprises one or more hardware state machines that are configured to perform acts described in more detail below.

In other embodiments, the control frame generator 142 and/or the signal field generator 146 are omitted.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In some embodiments, the MAC processor 166 implements a signal field generator (not shown) the same as or similar to the control frame generator 142 of the AP 114. In other embodiments, the MAC processor 166 does not include such a control frame generator. In some embodiments, the PHY processor 170 implements a signal field generator (not shown) the same as or similar to the signal field generator 146 of the AP 114. In other embodiments, the PHY processor 170 does not include such a signal field generator.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
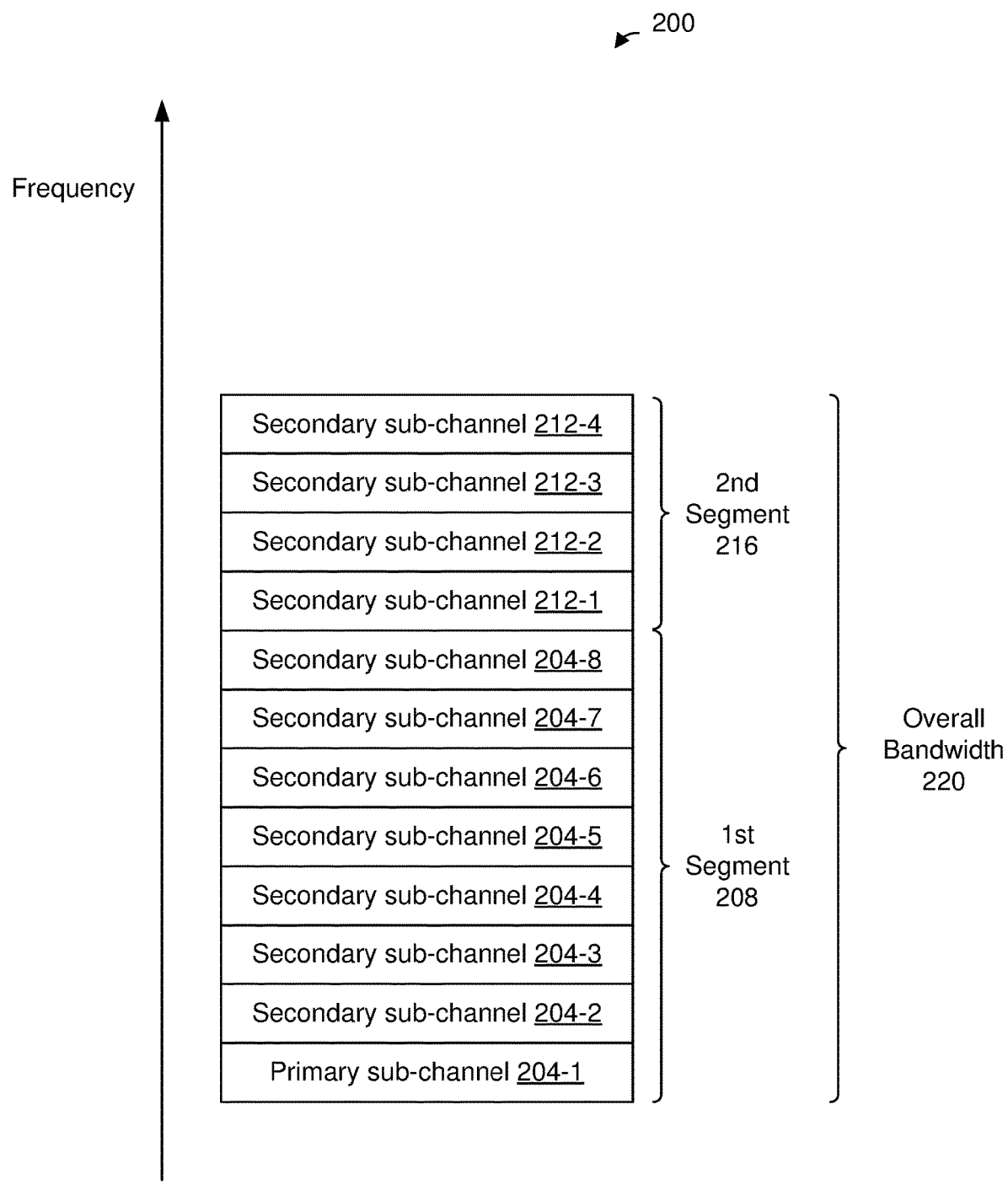
FIG. 2A is a diagram of an example communication channel having bandwidth greater than 160 MHz and including multiple frequency segments, according to an embodiment.

FIG. 2A is a diagram of an example operating channel 200 that is used in the communication system 110 of FIG. 1, according to an embodiment. The operating channel 200 comprises a plurality of subchannels 204 in a first frequency segment 208 and a plurality of subchannels 212 in a second frequency segment 216. The operating channel 200 spans an overall bandwidth 220. The overall bandwidth 378 comprises two segments 382 separated by a gap in frequency 386. In an embodiment, the first segment 208 and the second segment 216 are within a same radio frequency (RF) band.

In other embodiments, first segment 208 and the second segment 216 are in different RF bands. The Federal Communication Commission (FCC) now permits wireless local area networks (WLANs) to operate in multiple RF bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Regulatory agencies in other countries/regions also permit WLAN operation in the 2.4 GHz and 5 GHz bands, and are considering permitting WLAN operation the 6 GHz band. A future WLAN protocol, now under development, may permit multi-band operation in which a WLAN can use spectrum in multiple RF bands at the same time. For example, the future WLAN protocol may permit aggregation of spectrum in a first RF band with spectrum in a second RF band to form a composite communication channel that can be used to transmit packets that span the composite communication channel.

In one embodiment, each of the subchannels 204/212 spans 20 MHz. Thus, as illustrated in FIG. 2A, the first segment 208 spans 160 MHz and the second segment 216 spans 80 MHz. In other embodiments, the second segment 216 includes another suitable number of subchannels 212 (e.g., one, two, four, eight, etc.) and spans another suitable bandwidth, such as 20 MHz, 40 MHz, 160 MHz, etc.

One subchannel 204-1 in the first segment 208 is designated as a primary subchannel and the other subchannels 204/212 are designated as secondary subchannels. Control and/or management frames are transmitted in the primary subchannel 204-1, according to some embodiments. In some embodiments, the primary subchannel must be idle in order for any of the subchannels 204/212 to be used for a transmission, according to some embodiments. In some embodiments, a subchannel 212 in the second segment 216 is also designated as a primary subchannel (not shown). In other embodiments, no subchannel 212 in the second segment 216 is designated as a primary subchannel.

Figure 2B:
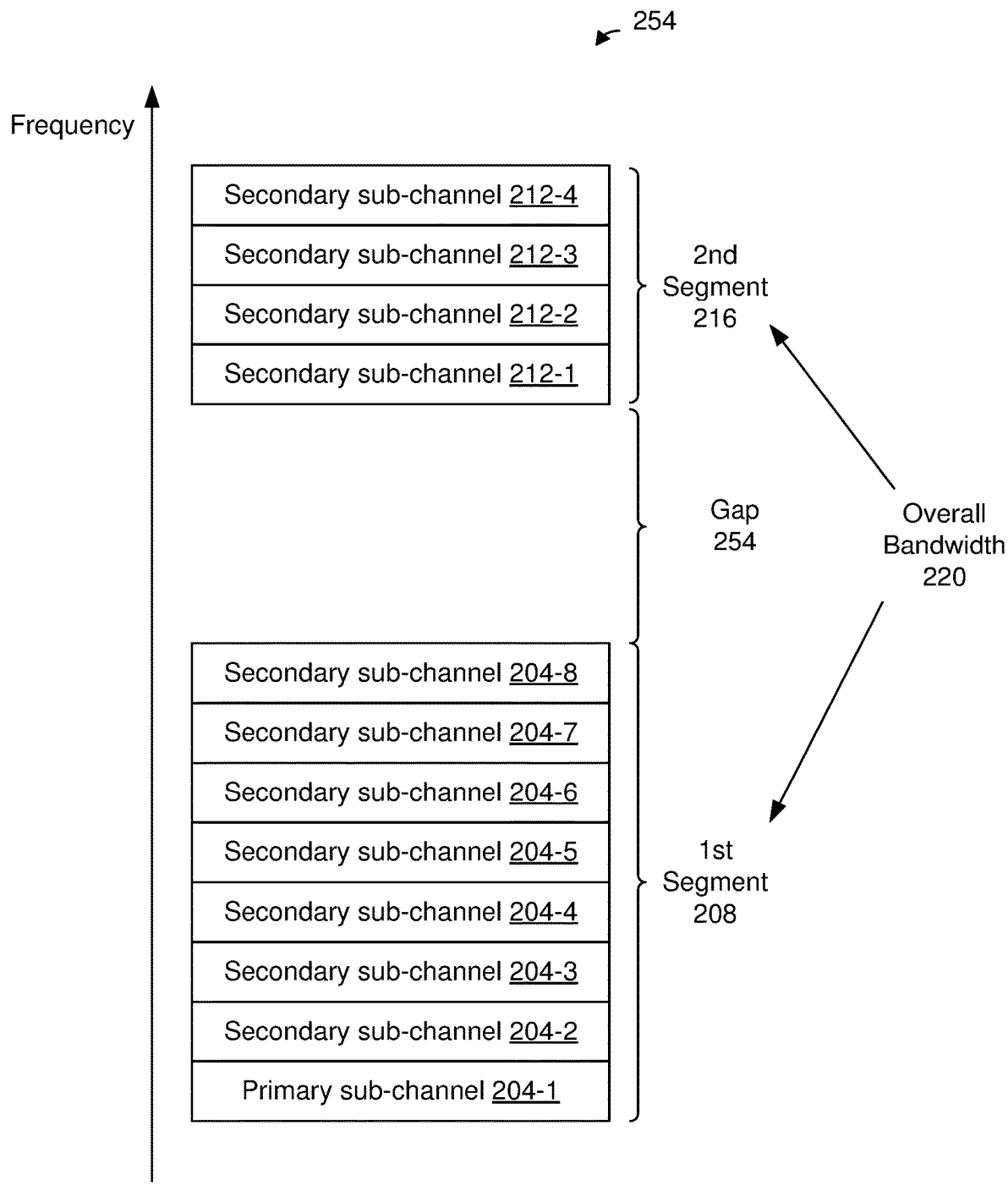
FIG. 2B is a diagram of another example communication channel having bandwidth greater than 160 MHz and including multiple frequency segments, according to another embodiment.

FIG. 2B is a diagram of another example operating channel 250 that is used in the communication system 110 of FIG. 1, according to another embodiment. The operating channel 250 is similar to the example operating channel 200 of FIG. 2A, and like-numbered elements are not described in detail for brevity. In the example operating channel 250 the first segment 208 and the second segment 216 are separated by a gap 254 in frequency. In some embodiments, the first segment 208 and the second segment 216 are in a same RF band. In other embodiments, the first segment 208 and the second segment 216 are in different RF bands.

Figure 2C:
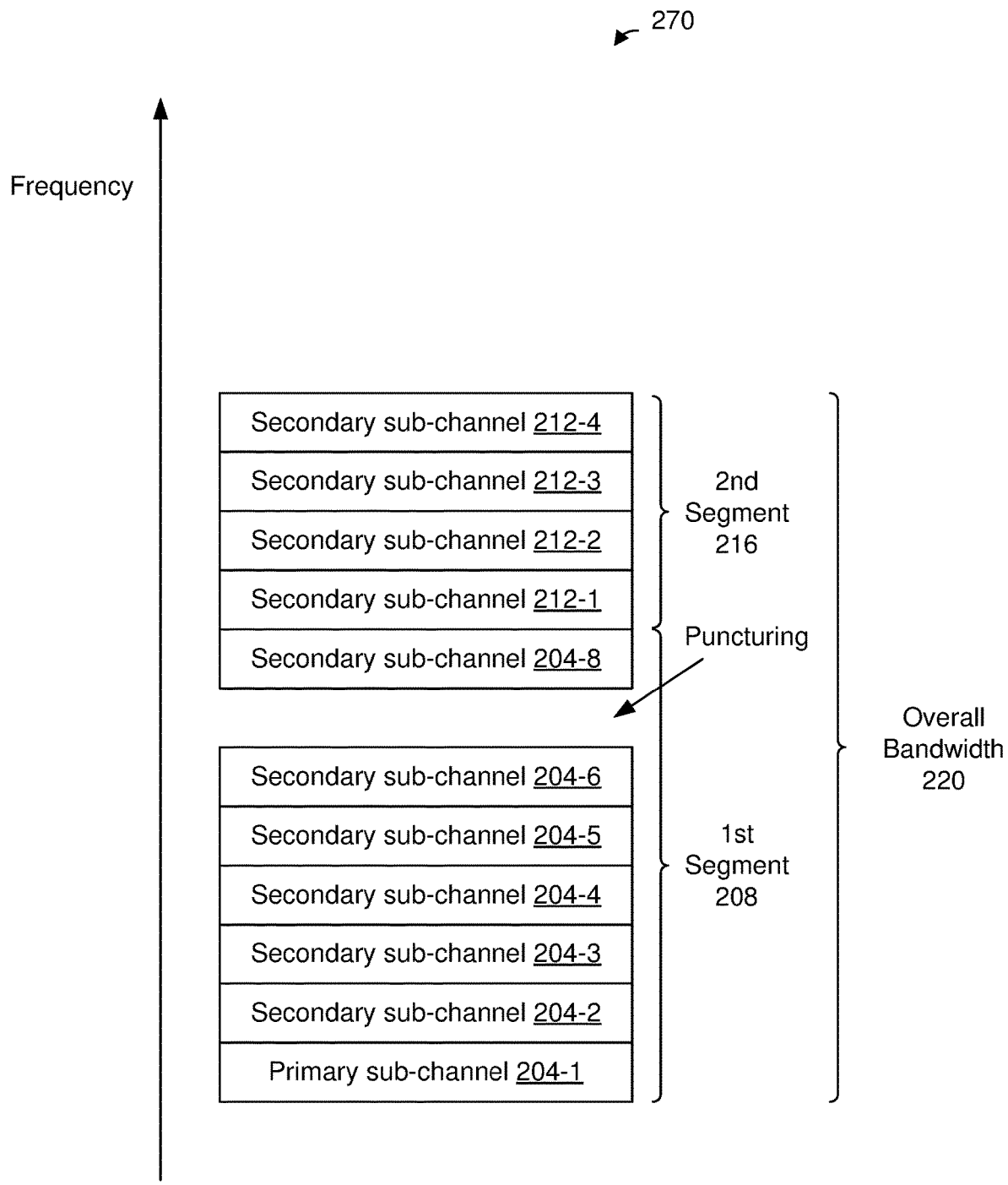
FIG. 2C is a diagram of yet another example communication channel having bandwidth greater than 160 MHz and including multiple frequency segments, according to another embodiment.

In some embodiments, one or more of the subchannels 204/212 are "punctured", e.g., nothing is transmitted within the "punctured" subchannels. FIG. 2C is a diagram of another example operating channel 270 that is used in the communication system 110 of FIG. 1, according to another embodiment. The operating channel 270 is similar to the example operating channel 200 of FIG. 2A and the example operating channel 250 of FIG. 2B, and like-numbered elements are not described in detail for brevity.

In the example operating channel 270, one of the subchannels (e.g., subchannel 204-7) is punctured. Although the example operating channel 270 is illustrated as having one punctured subchannel, other suitable operating channels include more than one punctured subchannel depending on the overall bandwidth and such that the aggregate bandwidth of the punctured operating channel is larger than an overall bandwidth of a next smaller sized operating channel that is permitted by the wireless communication protocol, according to various embodiments. In some embodiments, only secondary channels are permitted to be punctured. In other embodiments, primary channels are also permitted to be punctured.

Although the example operating channel 270 is illustrated as having a punctured subchannel in the first segment 208, the operating channel 270 additionally or alternatively includes one or more punctured subchannels in the second segment 216, in other embodiments.

In some embodiments, the first segment 208 and the second segment 216 are separated by a gap in frequency similar to the operating channel 250 of FIG. 2B.

Although the example operating channels 200, 250, and 270 of FIGS. 2A-C are illustrated as including two segments 208/216, other suitable operating channels include three or more segments. In some embodiments, the one or more segments are separated from the second segment by a gap in frequency in which nothing is transmitted.

In some embodiments, respective frequency segments such as illustrated in FIGS. 2A-C are associated with different MAC addresses. For example, a communication device (such as the AP 114 and/or the client station 154) may include multiple RF radios with each RF radio associated with a different MAC address. In some embodiments, when an AP uses respective RF radios to receive in respective frequency segments, the respective frequency segments are associated with the respective MAC addresses of the respective RF radios of the AP 114.

Figure 3A:
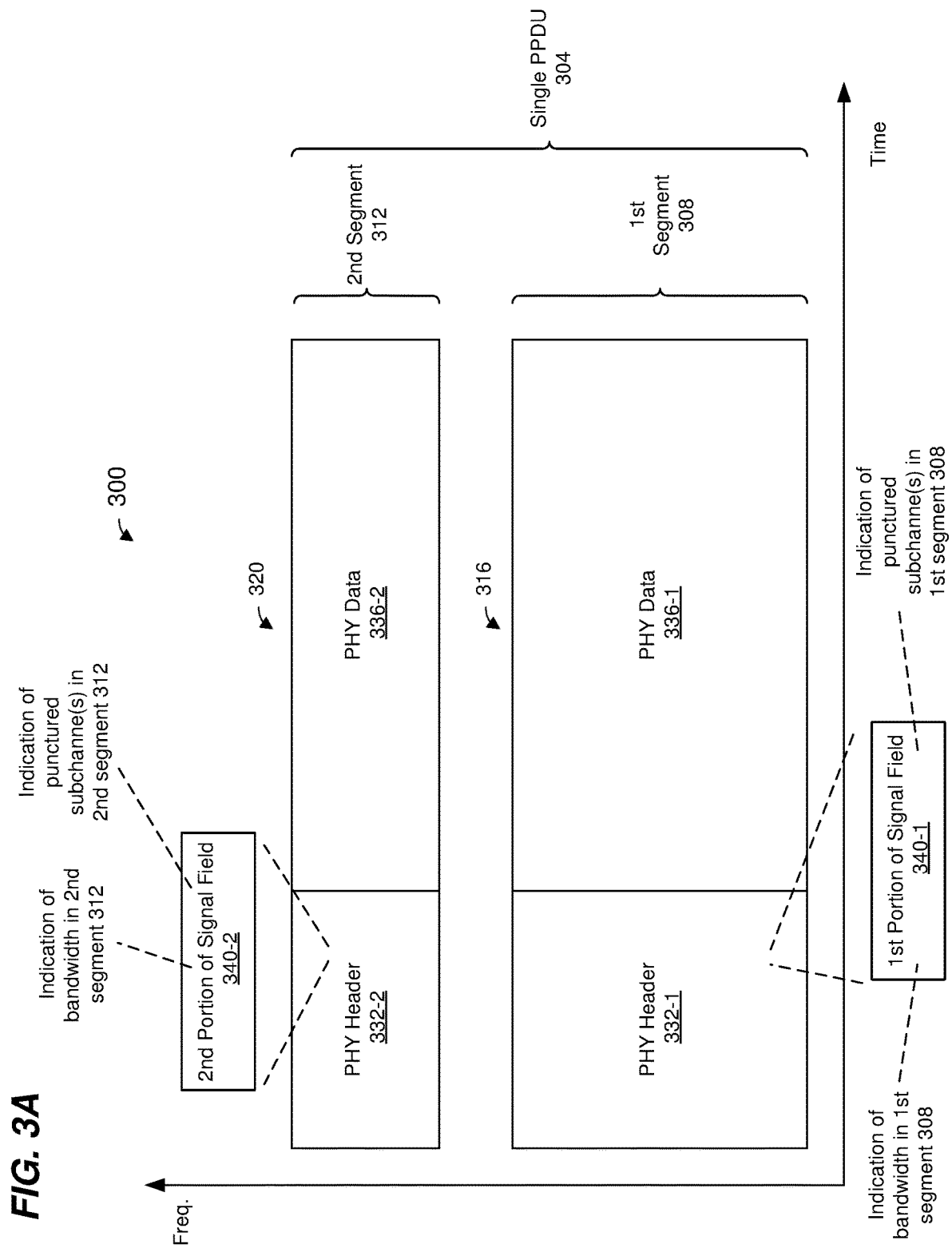
FIG. 3A is a diagram of an example transmission in a communication channel such as shown in FIGS. 2A-C, according to an embodiment.

FIG. 3A is a diagram of an example transmission 300 in a communication channel such as shown in FIGS. 2A-C, or in another suitable communication channel. The transmission 300 comprises a single PPDU 304 transmitted via multiple frequency segments including a first segment 308 and a second segment 312. A first portion 316 of the PPDU 304 is transmitted in the first segment 308, and a second portion 320 of the PPDU 304 is transmitted in the second segment 312.

In some embodiments, the first segment 308 is in a first RF band and the second segment 312 is in a second RF band. In other embodiments, the first segment 308 and the second segment 312 are in a same RF band. In some embodiments, the first segment 308 and the second segment 312 are separated by a gap in frequency. In other embodiments, the first segment 308 and the second segment 312 are adjacent in frequency, i.e., there is no gap in frequency between the first segment 308 and the second segment 312.

The PPDU 304 comprises a PHY header 332 and a PHY data portion 336. A first portion of the PHY header 332-1 is transmitted in the first frequency segment 308, and a second portion of the PHY header 332-2 is transmitted in the second frequency segment 312. Similarly, a first portion of the PHY data 336-1 is transmitted in the first frequency segment 308, and a second portion of the PHY data 336-2 is transmitted in the second frequency segment 312. The PHY header 332 and a PHY data portion 336 are transmitted simultaneously in the first segment 308 and the second segment 312.

The PHY header comprises 332 a signal field 340 with a first portion 340-1 of the signal field in the first frequency segment 308 and a second portion 340-2 of the signal field in the second frequency segment 312. In an embodiment, the first portion 340-1 of the signal field in the first frequency segment 308 includes different content than the second portion 340-2 of the signal field in the second frequency segment 312. For example, in an embodiment, the first portion 340-1 of the signal field in the first frequency segment 308 includes an indicator of a bandwidth of the first segment 308, and the second portion 340-2 of the signal field in the second frequency segment 312 includes an indicator of a bandwidth of the second segment 312. In an embodiment, the first portion 340-1 of the signal field in the first frequency segment 308 does not include an indicator of the bandwidth of the second segment 312, and the second portion 340-2 of the signal field in the second frequency segment 312 does not include an indicator of the bandwidth of the first segment 308. In some embodiments, the first portion 340-1 of the signal field in the first frequency segment 308 and the second portion 340-2 of the signal field in the second frequency segment 312 both include an indicator of an overall bandwidth of a channel in which the PPDU 304 is transmitted, e.g., an aggregate bandwidth of the first segment 308 and the second segment 312. In other embodiments, the first portion 340-1 of the signal field in the first frequency segment 308 and the second portion 340-2 of the signal field in the second frequency segment 312 do not include an indicator of the overall bandwidth of the channel in which the PPDU 304 is transmitted.

In some embodiments, one or more subchannels in the first segment 308 are punctured (not shown in FIG. 3A) and/or one or more subchannels in the second segment 312 are punctured (not shown in FIG. 3A). In some embodiments, the first portion 340-1 of the signal field in the first frequency segment 308 includes an indicator of punctured subchannel(s) (if any) in the first segment 308, and the second portion 340-2 of the signal field in the second frequency segment 312 includes an indicator of punctured subchannel(s) (if any) in the second segment 312. In an embodiment, the indicator of punctured subchannel(s) in the first segment 308 comprises a first bitmap in which respective bits of the first bitmap corresponds to respective subchannels in the first segment 308, and where a first value of a bit indicates the subchannel is not punctured whereas a second value of the bit indicates the subchannel is punctured. Similarly, in an embodiment, the indicator of punctured subchannel(s) in the second segment 312 comprises a second bitmap in which respective bits of the second bitmap corresponds to respective subchannels in the second segment 312, and where the first value of a bit indicates the subchannel is not punctured whereas the second value of the bit indicates the subchannel is punctured. In other embodiments, neither the first portion 340-1 of the signal field in the first frequency segment 308 nor the second portion 340-2 of the signal field in the second frequency segment 312 includes an indicator of punctured subchannel(s).

Although transmission of the PPDU 304 is illustrated in FIG. 3A as beginning at a same time in both the first segment 308 and the second segment 312, in other embodiments, transmission in the first segment 308 and transmission in the second segment 312 begin at different times. Similarly, although transmission of the PPDU 304 is illustrated in FIG. 3A as ending at a same time in both the first segment 308 and the second segment 312, in other embodiments, transmission in the first segment 308 and transmission in the second segment 312 end at different times. Similarly, although transmission of the PPDU 304 is illustrated in FIG. 3A as having a same duration in both the first segment 308 and the second segment 312, in other embodiments, transmission in the first segment 308 has a different duration than a duration of transmission in the second segment 312.

Figure 3B:
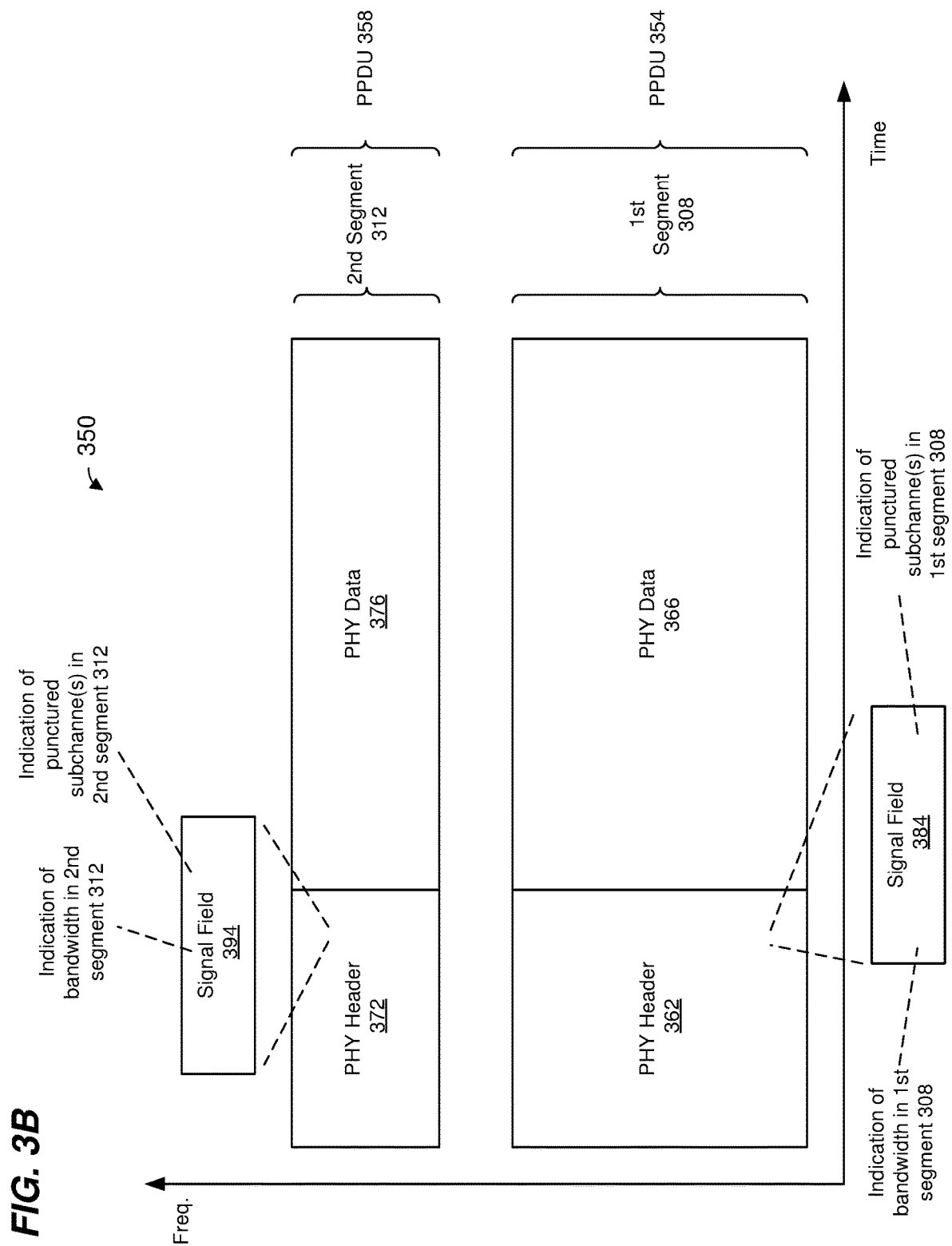
FIG. 3B is a diagram of another example transmission in a communication channel such as shown in FIGS. 2A-C, according to another embodiment.

FIG. 3B is a diagram of another example transmission 350 in a communication channel such as shown in FIGS. 2A-C, or in another suitable communication channel. The transmission 350 is similar to the example transmission 300 of FIG. 3A, but different PPDUs are transmitted in the first segment 308 and the second segment 312. In particular, the transmission 350 comprises a first PPDU 354 transmitted in the first segment 308 and a second PPDU 358 transmitted in the second segment 312. The first PPDU 354 is transmitted simultaneously with transmission of the second PPDU 358.

The PPDU 354 comprises a PHY header 362 and a PHY data portion 366. Similarly, the PPDU 358 comprises a PHY header 372 and a PHY data portion 376.

The PHY header 362 comprises a signal field 384, and the PHY header 372 includes a signal field 394. In an embodiment, the signal field 384 in the first frequency segment 308 includes an indicator of a bandwidth of the first segment 308, and the signal field 394 in the second frequency segment 312 includes an indicator of a bandwidth of the second segment 312. In an embodiment, the signal field 384 in the first frequency segment 308 does not include an indicator of the bandwidth of the second segment 312, and the signal field 394 in the second frequency segment 312 does not include an indicator of the bandwidth of the first segment 308. In some embodiments, the signal field 384 in the first frequency segment 308 and the signal field 394 in the second frequency segment 312 both include an indicator of an overall bandwidth of a channel in which the PPDUs 354 and 358 are transmitted, e.g., an aggregate bandwidth of the first segment 308 and the second segment 312. In other embodiments, the signal field 384 in the first frequency segment 308 and the signal field 394 in the second frequency segment 312 do not include an indicator of the overall bandwidth of the channel in which the PPDUs 354 and 358 are transmitted.

In some embodiments, one or more subchannels in the first segment 308 are punctured (not shown in FIG. 3B) and/or one or more subchannels in the second segment 312 are punctured (not shown in FIG. 3B). In some embodiments, the signal field 384 in the first frequency segment 308 includes an indicator of punctured subchannel(s) (if any) in the first segment 308, and the signal field 394 in the second frequency segment 312 includes an indicator of punctured subchannel(s) (if any) in the second segment 312. In an embodiment, the indicator of punctured subchannel(s) in the first segment 308 comprises a first bitmap in which respective bits of the first bitmap corresponds to respective subchannels in the first segment 308, and where a first value of a bit indicates the subchannel is not punctured whereas a second value of the bit indicates the subchannel is punctured. Similarly, in an embodiment, the indicator of punctured subchannel(s) in the second segment 312 comprises a second bitmap in which respective bits of the second bitmap corresponds to respective subchannels in the second segment 312, and where the first value of a bit indicates the subchannel is not punctured whereas the second value of the bit indicates the subchannel is punctured. In other embodiments, neither the first signal field 384 in the first frequency segment 308 nor the signal field 394 in the second frequency segment 312 includes an indicator of punctured subchannel(s).

Although transmission of the PPDUs 354 and 358 are illustrated in FIG. 3B as beginning at a same time in both the first segment 308 and the second segment 312, in other embodiments, transmission of the PPDU 354 in the first segment 308 and transmission of the PPDU 358 in the second segment 312 begin at different times. Similarly, although transmission of the PPDUs 354 and 358 are illustrated in FIG. 3B as ending at a same time in both the first segment 308 and the second segment 312, in other embodiments, transmission of the PPDU 354 in the first segment 308 and transmission of the PPDU 358 in the second segment 312 end at different times. Similarly, although transmission of the PPDU 354 is illustrated in FIG. 3B as having a same duration as transmission of the PPDU 358, in other embodiments, transmission of the PPDU 354 in the first segment 308 has a different duration than a duration of transmission of the PPDU 358 in the second segment 312.

Referring now to FIGS. 3A-B, the signal fields 340/384/394 optionally include duration information indicating duration(s) of the PPDUs 304/354/358, according to some embodiments, and a communication device that receives the any of the PPDUs 304/354/358 is configured to use duration information and bandwidth indication(s) in the signal fields 340/384/394 to determine a transmit opportunity period (TXOP) (or multiple TXOPs) corresponding to the transmissions 300/350 in the first segment 308 and the second segment 312. If the transmissions 300/350 are not intended for the communication device, the communication device may refrain from attempting to use the first segment 308 or the second segment 312 during the TXOP, according to some embodiments.

In other embodiments, the communication device is configured to also use indication(s) of punctured subchannels in the signal fields 340/384/394 to determine the TXOP (or multiple TXOPs) corresponding to the transmissions 300/350 in the first segment 308 and the second segment 312, taking into account the punctured subchannels (if any). If the transmissions 300/350 are not intended for the communication device, the communication device may refrain from attempting to use the first segment 308 (minus any punctured subchannels) or the second segment 312 (minus any punctured subchannels) during the TXOP, according to some embodiments. In some embodiments, the communication device may attempt to use one or more punctured subchannels in the first segment 308 or the second segment 312 during the TXOP.

Although indications of bandwidths of different frequency segments of a communication channel and indications of punctured subchannel(s) in the different frequency segments were described with reference to FIGS. 3A-B as being included in PHY headers of packets, in other embodiments, indications of bandwidths of different frequency segments of a communication channel and/or indications of punctured subchannel(s) in the different frequency segments are additionally or alternatively included in MAC data units.

In some embodiments, different segments of spectrum are associated with different spectrum segment identifiers (IDs). For example, different RF bands correspond with different respective spectrum segment IDs, according to an embodiment. In other embodiments, an RF band may be partitioned into a plurality of spectrum segments corresponding to different respective spectrum segment IDs. In other embodiments, a plurality of spectrum segments across a plurality of RF bands correspond to different respective spectrum segment IDs. Referring now to FIG. 3A, in some embodiments, the first portion 340-1 of the signal field additionally includes a first spectrum segment ID corresponding to the segment 308, and the second portion 340-2 of the signal field additionally includes a second spectrum segment ID corresponding to the segment 312. In other embodiments, neither the first portion 340-1 of the signal field nor the second portion 340-2 of the signal field includes any spectrum segment IDs corresponding to the segment 308 or the segment 312. In some embodiments, the first portion 340-1 of the signal field additionally includes a first MAC address corresponding to the segment 308, and the second portion 340-2 of the signal field additionally includes a second MAC address corresponding to the segment 312. In other embodiments, the first portion 340-1 of the signal field does not include the first MAC address corresponding to the segment 308, and the second portion 340-2 of the signal field does not include the second MAC address corresponding to the segment 312.

Referring now to FIG. 3B, in some embodiments, the signal field 384 additionally includes a first spectrum segment ID corresponding to the segment 308, and the signal field 394 additionally includes a second spectrum segment ID corresponding to the segment 312. In other embodiments, neither the signal field 384 nor the signal field 394 includes any spectrum segment IDs corresponding to the segment 308 or the segment 312. In some embodiments, the signal field 384 additionally includes a first MAC address corresponding to the segment 308, and the signal field 394 additionally includes a second MAC address corresponding to the segment 312. In other embodiments, the signal field 384 does not include the first MAC address corresponding to the segment 308, and the signal field 394 does not include the second MAC address corresponding to the segment 312.

Referring now to FIGS. 3A-B, in some embodiments, rather than a signal field including the indication of the bandwidth of in the frequency segment, a service field in a PHY data portion (e.g., in the PHY data portion 336-1/336-2 or in the PHY data portion 376/366) includes the indication of the bandwidth. For example, a network interface device sets (e.g., the network interface device 122 sets, the MAC processor 126 sets, the control frame generator sets, etc.) a transmitter address field in a MAC header in the packet to a bandwidth signaling address, which indicates that the service field includes the indication of the bandwidth.

Similarly, in various embodiments, the service field additionally or alternatively includes one or both of: an indicator of punctured subchannel(s) in the frequency segment and a spectrum segment ID, such as discussed above.

Figure 4:
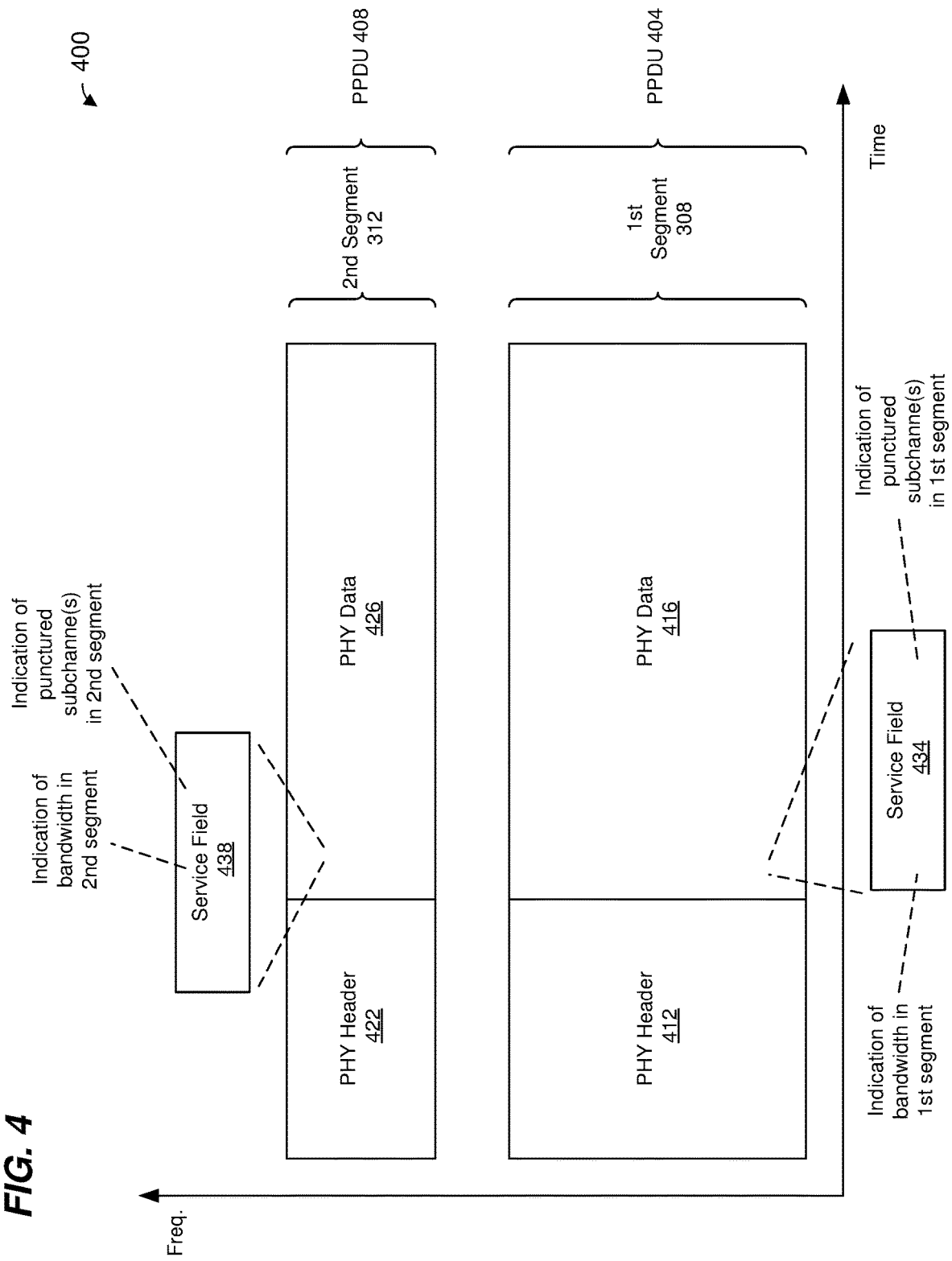
FIG. 4 is a diagram of yet another example transmission in a communication channel such as shown in FIGS. 2A-C, according to another embodiment.

FIG. 4 is a diagram of another example transmission 400 in a communication channel such as shown in FIGS. 2A-C, or in another suitable communication channel. The transmission 400 comprises a first PPDU 404 transmitted in the first segment 308 and a second PPDU 408 transmitted in the second segment 312. The first PPDU 404 is transmitted simultaneously with transmission of the second PPDU 408.

The PPDU 404 comprises a PHY header 412 and a PHY data portion 416. Similarly, the PPDU 408 comprises a PHY header 422 and a PHY data portion 426.

The PHY data portion 416 comprises a service field 434, and the PHY data portion 426 includes a service field 438. In an embodiment, the service field 434 in the first frequency segment 308 includes an indicator of a bandwidth of the first segment 308, and the service field 438 in the second frequency segment 312 includes an indicator of a bandwidth of the second segment 312. In an embodiment, the service field 434 in the first frequency segment 308 does not include an indicator of the bandwidth of the second segment 312, and the service field 438 in the second frequency segment 312 does not include an indicator of the bandwidth of the first segment 308. In some embodiments, the service field 434 in the first frequency segment 308 and the service field 438 in the second frequency segment 312 both include an indicator of an overall bandwidth of a channel in which the PPDUs 404 and 408 are transmitted, e.g., an aggregate bandwidth of the first segment 308 and the second segment 312. In other embodiments, the service field 434 in the first frequency segment 308 and the service field 438 in the second frequency segment 312 do not include an indicator of the overall bandwidth of the channel in which the PPDUs 404 and 408 are transmitted.

In some embodiments, one or more subchannels in the first segment 308 are punctured (not shown in FIG. 4) and/or one or more subchannels in the second segment 312 are punctured (not shown in FIG. 4). In some embodiments, the service field 434 in the first frequency segment 308 includes an indicator of punctured subchannel(s) (if any) in the first segment 308, and the service field 438 in the second frequency segment 312 includes an indicator of punctured subchannel(s) (if any) in the second segment 312. In an embodiment, the indicator of punctured subchannel(s) in the first segment 308 comprises a first bitmap in which respective bits of the first bitmap corresponds to respective subchannels in the first segment 308, and where a first value of a bit indicates the subchannel is not punctured whereas a second value of the bit indicates the subchannel is punctured. Similarly, in an embodiment, the indicator of punctured subchannel(s) in the second segment 312 comprises a second bitmap in which respective bits of the second bitmap corresponds to respective subchannels in the second segment 312, and where the first value of a bit indicates the subchannel is not punctured whereas the second value of the bit indicates the subchannel is punctured. In other embodiments, neither the service field 434 in the first frequency segment 308 nor the service field 438 in the second frequency segment 312 includes an indicator of punctured subchannel(s).

Although transmission of the PPDUs 404 and 408 are illustrated in FIG. 4 as beginning at a same time in both the first segment 308 and the second segment 312, in other embodiments, transmission of the PPDU 404 in the first segment 308 and transmission of the PPDU 408 in the second segment 312 begin at different times. Similarly, although transmission of the PPDUs 404 and 408 are illustrated in FIG. 4 as ending at a same time in both the first segment 308 and the second segment 312, in other embodiments, transmission of the PPDU 404 in the first segment 308 and transmission of the PPDU 408 in the second segment 312 end at different times. Similarly, although transmission of the PPDU 404 is illustrated in FIG. 4 as having a same duration as transmission of the PPDU 408, in other embodiments, transmission of the PPDU 404 in the first segment 308 has a different duration than a duration of transmission of the PPDU 408 in the second segment 312.

MAC headers (not shown) in the PHY data portions 416/426 include duration information indicating duration(s) of the PPDUs 404/408, according to some embodiments, and a communication device that receives any of the PPDUs 404/408 is configured to use duration information and bandwidth indication(s) in the service fields 434/438 to determine a TXOP (or multiple TXOPs) corresponding to the transmissions PPDUs 404/408 in the first segment 308 and the second segment 312. If the PPDUs 404/408 are not intended for the communication device, the communication device may refrain from attempting to use the first segment 308 or the second segment 312 during the TXOP, according to some embodiments.

In other embodiments, the communication device is configured to also use indication(s) of punctured subchannels in the service fields 434/438 to determine the TXOP (or multiple TXOPs) corresponding to the PPDUs 404/408 in the first segment 308 and the second segment 312, taking into account the punctured subchannels (if any). If the PPDUs 404/408 are not intended for the communication device, the communication device may refrain from attempting to use the first segment 308 (minus any punctured subchannels) or the second segment 312 (minus any punctured subchannels) during the TXOP, according to some embodiments. In some embodiments, the communication device may attempt to use one or more punctured subchannels in the first segment 308 or the second segment 312 during the TXOP.

In some embodiments, the service field 434 additionally includes a first spectrum segment ID corresponding to the segment 308, and the service field 438 additionally includes a second spectrum segment ID corresponding to the segment 312. In other embodiments, neither the service field 434 nor the service field 438 includes any spectrum segment IDs corresponding to the segment 308 or the segment 312.

In an embodiment, a network interface device sets (e.g., the network interface device 122 sets, the MAC processor 126 sets, the control frame generator sets, etc.) a transmitter address field in a MAC header in the PPDU 404 to a bandwidth signaling address, which indicates that the service field 434 includes the indication of the bandwidth, and sets a transmitter address field in a MAC header in the PPDU 408 to a bandwidth signaling address, which indicates that the service field 438 includes the indication of the bandwidth.

Figures 5A, 5B:
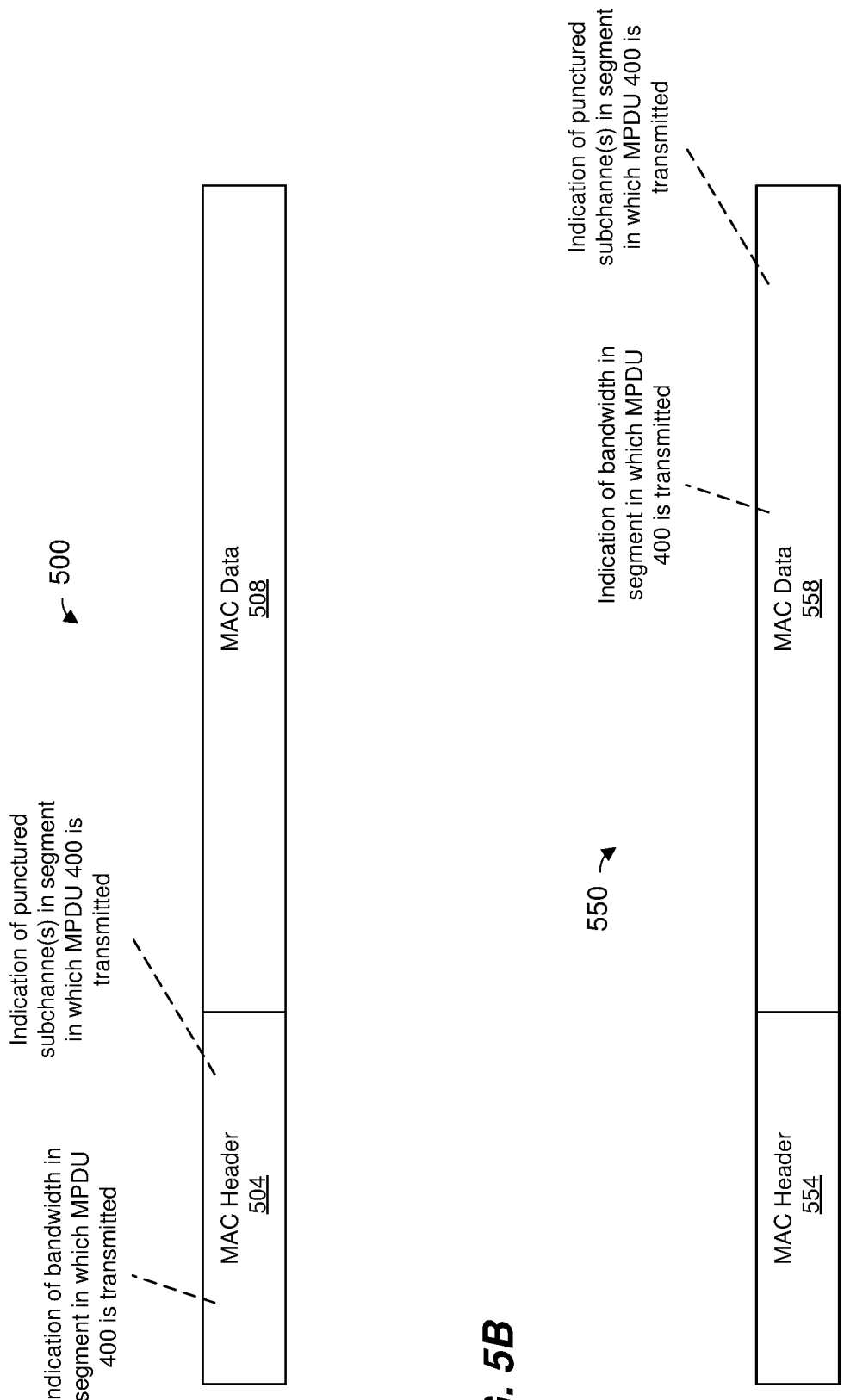
FIGS. 5A-B are diagrams of example media access control (MAC) layer data units transmitted in a communication channel such as shown in FIGS. 2A-C, according to an embodiment.

FIG. 5A is a diagram of an example MAC data unit (e.g., an MPDU) 500 that is transmitted in a communication channel such as described with reference to FIGS. 2A-C, or in another suitable communication channel that includes two or more frequency segments, according to an embodiment. The MAC data unit 500 is transmitted within one frequency segment of the communication channel, but is not transmitted within other frequency segment(s) of the communication channel, according to an embodiment.

In various embodiments, the MAC data unit 500 comprises a management frame, a control frame, a data frame, etc. In various illustrative embodiments, the MAC data unit 500 comprises a null data packet announcement (NDPA) frame, a request-to-send (RTS) frame, a clear-to-send (CTS) frame, a trigger frame (e.g., configured to prompt an uplink transmission), a quality of service (QoS) null frame, etc.

The MAC data unit 500 includes a MAC header 504 and a MAC data portion 508. In some embodiments, the MAC data portion 508 is omitted. The MAC header 504 includes an indication of a bandwidth of a frequency segment of the communication channel in which the MAC data unit 500 is transmitted, according to an embodiment. The MAC header 504 does not include an indication(s) of a bandwidth(s) of any other frequency segment(s) of the communication channel, according to an embodiment. In some embodiments, the MAC header 504 does not include an indication of an overall bandwidth of the communication channel. In other embodiments, the MAC header 504 includes indication(s) of bandwidth(s) of other frequency segment(s) of the communication channel and/or an indication of an overall bandwidth of the communication channel.

In some embodiments, the MAC header 504 additionally includes an indicator of punctured subchannel(s) (if any) in the frequency segment in which the MAC data unit 500 is transmitted. In an embodiment, the indicator of punctured subchannel(s) comprises a bitmap in which respective bits of the bitmap corresponds to respective subchannels in the frequency segment in which the MAC data unit 500 is transmitted, where a first value of a bit indicates the subchannel is not punctured whereas a second value of the bit indicates the subchannel is punctured.

In some embodiments, the MAC header 504 additionally includes a spectrum segment ID corresponding to the frequency segment in which the MAC data unit 500 is transmitted. In other embodiments, MAC header 504 does not include a spectrum segment ID corresponding to the frequency segment in which the MAC data unit 500 is transmitted.

FIG. 5B is a diagram of another example MAC data unit (e.g., an MPDU) 550 that is transmitted in a communication channel such as described with reference to FIGS. 2A-C, or in another suitable communication channel that includes two or more frequency segments, according to an embodiment. The MAC data unit 550 is transmitted within one frequency segment of the communication channel, but is not transmitted within other frequency segment(s) of the communication channel, according to an embodiment.

In various embodiments, the MAC data unit 550 comprises a management frame, a control frame, a data frame, etc. In various illustrative embodiments, the MAC data unit 500 comprises a null data packet announcement (NDPA) frame, a request-to-send (RTS) frame, a clear-to-send (CTS) frame, a trigger frame (e.g., configured to prompt an uplink transmission), a quality of service (QoS) null frame, etc.

The MAC data unit 550 includes a MAC header 554 and a MAC data portion 558. The MAC data portion 558 includes an indication of a bandwidth of a frequency segment of the communication channel in which the MAC data unit 550 is transmitted, according to an embodiment. The MAC data portion 558 does not include an indication(s) of a bandwidth(s) of any other frequency segment(s) of the communication channel, according to an embodiment. In some embodiments, the MAC data portion 558 does not include an indication of an overall bandwidth of the communication channel. In other embodiments, the MAC data portion 558 includes indication(s) of bandwidth(s) of other frequency segment(s) of the communication channel and/or an indication of an overall bandwidth of the communication channel.

In some embodiments, the MAC data portion 558 additionally includes an indicator of punctured subchannel(s) (if any) in the frequency segment in which the MAC data unit 500 is transmitted. In an embodiment, the indicator of punctured subchannel(s) comprises a bitmap in which respective bits of the bitmap corresponds to respective subchannels in the frequency segment in which the MAC data unit 500 is transmitted, where a first value of a bit indicates the subchannel is not punctured whereas a second value of the bit indicates the subchannel is punctured.

In some embodiments, the MAC data portion 558 additionally includes a spectrum segment ID corresponding to a segment of spectrum in which the MAC data unit 550 is transmitted. In other embodiments, MAC data portion 558 does not include a spectrum segment ID corresponding to the frequency segment in which the MAC data unit 500 is transmitted. In some embodiments, the MAC data portion 558 additionally includes a MAC address corresponding to the frequency segment in which the MAC data unit 550 is transmitted. In other embodiments, MAC data portion 558 does not include a MAC address corresponding to the frequency segment in which the MAC data unit 500 is transmitted.

In any of the examples described above with reference to FIGS. 3A-5B, a signal field, a service field, a MAC header, a MAC data portion, etc., includes an indicator of punctured subchannels across the overall bandwidth of the communication channel, according to some embodiments.

Figure 6:
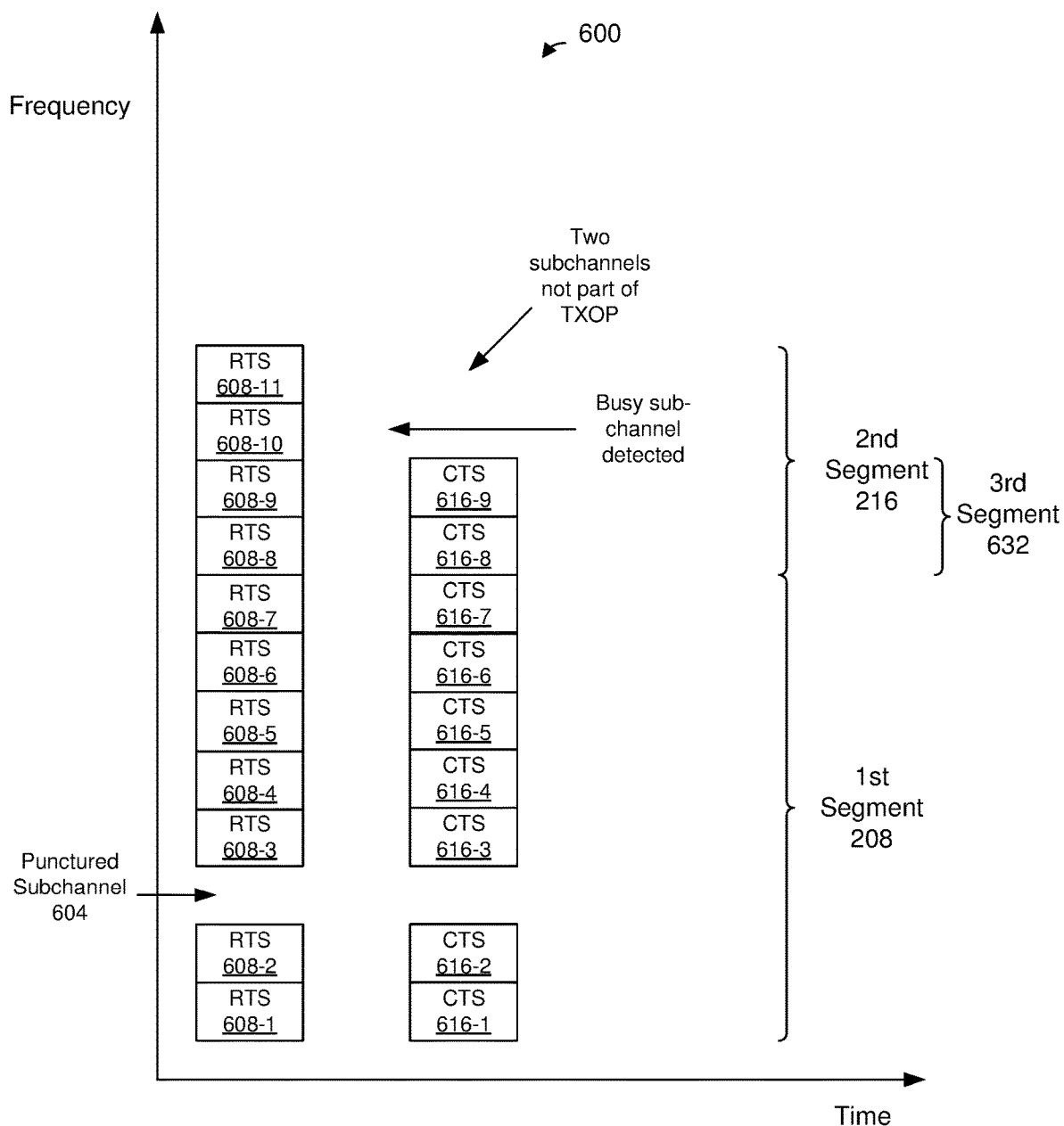
FIG. 6 is a diagram of an example request-to-send (RTS)/clear-to-send (CTS) exchange for negotiating a communication channel such as shown in FIGS. 2A-C, according to an embodiment.

FIG. 6 is a diagram of an example RTS/CTS exchange 600 for negotiating a communication channel to use for a TXOP, according to an embodiment. A first communication device transmits a plurality of RTS frames 608 in a plurality of subchannels of a communication channel to a second communication device. The communication channel includes the first frequency segment 208 and the second frequency segment 216 discussed above with reference to FIGS. 2A-C, according to some embodiments. The communication channel includes a punctured subchannel 604, and thus an RTS frame is not transmitted in the subchannel 604.

The RTS frames 608 are transmitted in packets such as described with reference to FIG. 3B or 4, or in other suitable packets, according to various embodiments. In some embodiments, RTS frames 608 transmitted in the first segment 208 are transmitted in packets that include a service field with a bandwidth indicator indicating the first frequency segment 208, and RTS frames 608 transmitted in the second segment 216 are transmitted in packets that include a service field with a bandwidth indicator indicating the second frequency segment 216. In some embodiments, RTS frames 608 transmitted in the first segment 208 are transmitted in packets that include a signal field with a bandwidth indicator indicating the first frequency segment 208, and RTS frames 608 transmitted in the second segment 216 are transmitted in packets that include a signal field with a bandwidth indicator indicating the second frequency segment 216.

In some embodiments, the RTS frames 608 include an indicator of punctured subchannel(s) in the overall communication channel. For example, in some embodiments, all of the RTS frames 608 include a bitmap corresponding to the overall communication channel, the bitmap indicating the subchannel 604 is punctured. In other embodiments, RTS frames 608 transmitted in the first segment 208 include a bitmap corresponding to the first segment 208 that indicates the subchannel 604 is punctured, and RTS frames 608 transmitted in the second segment 216 include a bitmap corresponding to the second segment 216.

In response to receiving the RTS frames 608, the second communication device determines whether subchannels in which the second communication device received RTS frames 608 are idle. In the example of FIG. 6, the second communication device determines that all of the subchannels (which are not punctured) in the first segment 208 are idle, but determines that one of the subchannels in the second segment 216 in is not idle (i.e., is busy). Because all of the subchannels in the first segment 208 in which RTS frames 608 were received were idle, the second communication device transmits CTS frames 616 in all of the subchannels in the first segment 208 in which RTS frames 608 were received. On the other hand, because one of the subchannels in the second segment 216 was not idle, the second communication device determines a next smallest allowed aggregation of subchannels within the second segment 216 that does not use the busy subchannel, and transmits CTS frames within those subchannels. As a result, the second communication device transmits CTS frames in a third segment 632 that omits two subchannels from the second segment 216 even though only one subchannel was determined to be busy.

The subchannels in which CTS frames 616 are transmitted establish the subchannels to be used for the TXOP, according to an embodiment. In other embodiments in which the CTS frames 616 include indications of punctured channel(s), if any, the indications of punctured channel(s), if any, in the CTS frames 616 additionally or alternatively establish the subchannels to be used for the TXOP.

The CTS frames 616 are transmitted in packets such as described with reference to FIG. 3B or 4, or in other suitable packets such as packets that do not have signal fields and/or service fields with bandwidth indicators, according to various embodiments. In some embodiments, CTS frames 616 transmitted in the first segment 208 are transmitted in packets that include a service field with a bandwidth indicator indicating the first frequency segment 208, and CTS frames 616 transmitted in the third segment 632 are transmitted in packets that include a service field with a bandwidth indicator indicating the second frequency segment 216. In some embodiments, CTS frames 616 transmitted in the third segment 632 are transmitted in packets that include a service field with a bandwidth indicator indicating the third frequency segment 632.

In some embodiments, CTS frames 616 transmitted in the first segment 208 are transmitted in packets that include a signal field with a bandwidth indicator indicating the first frequency segment 208, and CTS frames 616 transmitted in the third segment 632 are transmitted in packets that include a signal field with a bandwidth indicator indicating the second frequency segment 216. In some embodiments, CTS frames 616 transmitted in the third segment 632 are transmitted in packets that include a signal field with a bandwidth indicator indicating the third frequency segment 632.

In some embodiments, the CTS frames 616 include an indicator of punctured subchannel(s) in the overall communication channel. For example, in some embodiments, all of the CTS frames 616 include a bitmap corresponding to the overall communication channel, the bitmap indicating the subchannel 604 is punctured. In other embodiments, CTS frames 616 transmitted in the first segment 208 include a bitmap corresponding to the first segment 208 that indicates the subchannel 604 is punctured, and CTS frames 616 transmitted in the third segment 632 include a bitmap corresponding to the second segment 216 (or the third segment).

In some embodiments, the CTS frames 616 do not include a bandwidth indicator such as described above and/or do not include an indicator of punctured subchannels as described above.

Figure 7:
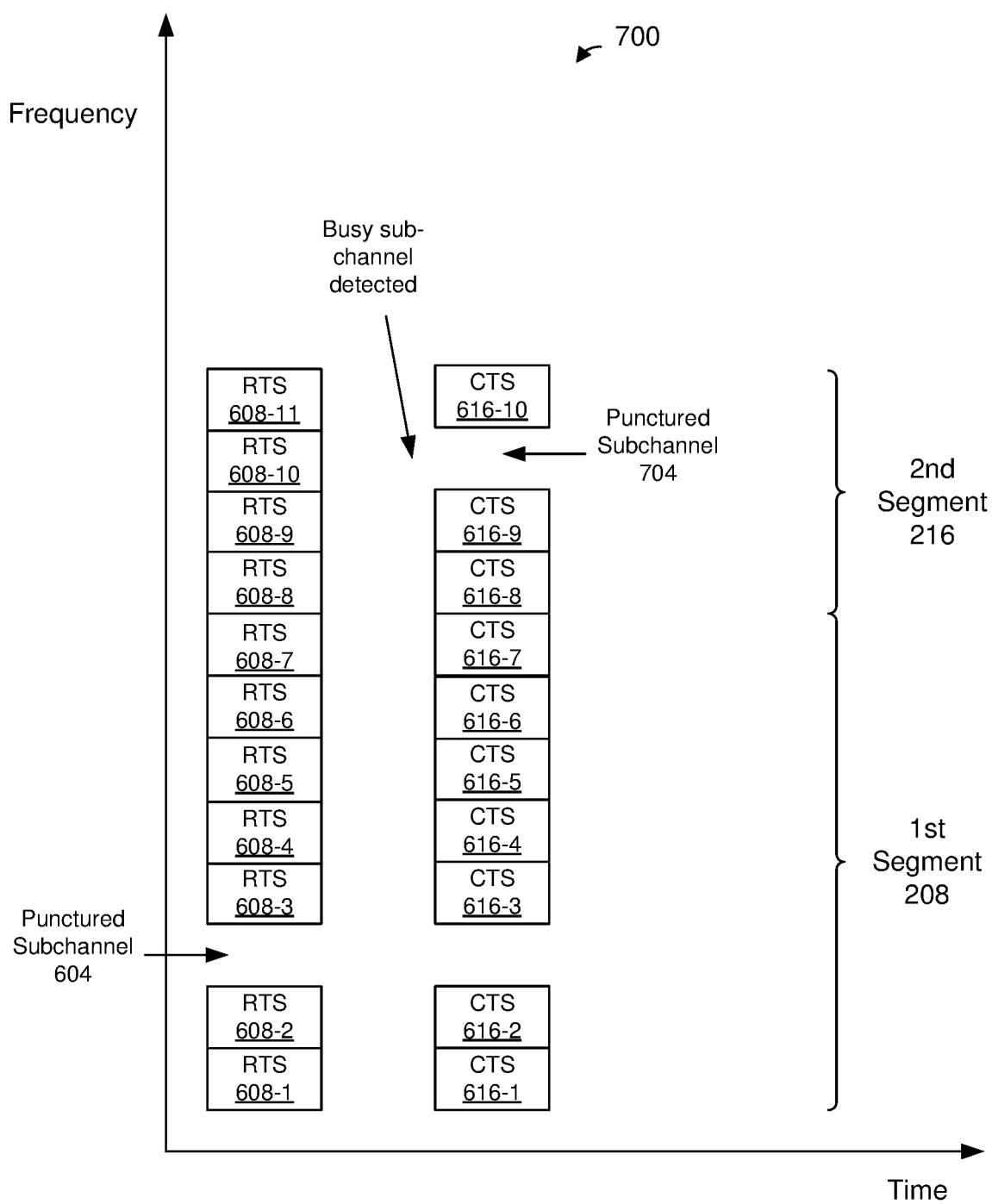
FIG. 7 is a diagram of another example RTS/CTS exchange for negotiating a communication channel such as shown in FIGS. 2A-C, according to another embodiment.

FIG. 7 is a diagram of another example RTS/CTS exchange 700 for negotiating a communication channel to use for a TXOP, according to another embodiment. The RTS/CTS exchange 700 is similar to the RTS/CTS exchange 600 of FIG. 6, and like numbered elements are not discussed in detail for brevity.

As in RTS/CTS exchange 600 of FIG. 6, the second communication device determines that one of the subchannels in the second segment 216 is not idle. Because the one subchannel in the second segment 216 is not idle, the second communication device transmits CTS frames 616 in the remaining subchannels of the second segment 216.

The CTS frames 616 are transmitted in packets such as described with reference to FIG. 3B or 4, or in other suitable packets, according to various embodiments. Similar to the RTS/CTS exchange 600 of FIG. 6, CTS frames 616 transmitted in the first segment 208 are transmitted in packets that include a service field (or a signal field) with a bandwidth indicator indicating the first frequency segment 208, and CTS frames 616 transmitted in the second segment 216 are transmitted in packets that include a service field (or a signal field) with a bandwidth indicator indicating the second frequency segment 216.

In some embodiments, the CTS frames 616 include an indicator of punctured subchannel(s) in the overall communication channel. For example, in some embodiments, all of the CTS frames 616 include a bitmap corresponding to the overall communication channel, the bitmap indicating the subchannel 604 and the subchannel 704 are punctured. In other embodiments, CTS frames 608 transmitted in the first segment 208 include a bitmap corresponding to the first segment 208 that indicates the subchannel 604 is punctured, and CTS frames 616 transmitted in the second segment 216 include a bitmap corresponding to the second segment 216 that indicates the subchannel 704 is punctured.

In some embodiments, the CTS frames 616 do not include a bandwidth indicator such as described above and/or do not include an indicator of punctured subchannels as described above.

The subchannels in which CTS frames 616 are transmitted establish the subchannels to be used for the TXOP, according to an embodiment. In other embodiments in which the CTS frames 616 include indications of punctured channel(s), if any, the indications of punctured channel(s), if any, in the CTS frames 616 additionally or alternatively establish the subchannels to be used for the TXOP.

Referring now to FIGS. 6 and 7, in some embodiments, each of the RTS frames 608 and the CTS frames 616 are transmitted in a 20 MHz-wide legacy PPDU (sometimes referred to in the IEEE 802.11 Standard as a "non-HT PPDU"). Duplicates of a PPDU including RTS frames 608 (sometimes referred to in the IEEE 802.11 Standard as a "non-HT duplicate PPDU") in the first segment 208 are transmitted in each 20 MHz subchannel (except in any punctured subchannels) of the first segment 208. Similarly, RTS frames in non-HT duplicate PPDUs are transmitted in each 20 MHz subchannel (except in any punctured subchannels) of the second segment 216. CTS frames 616 are similarly transmitted in non-HT duplicate PPDUs, according to some embodiments.

In other embodiments, each of the RTS frames 608 and the CTS frames 616 are transmitted in other suitable PPDUs, such as a non-legacy PPDU.

Figure 8:
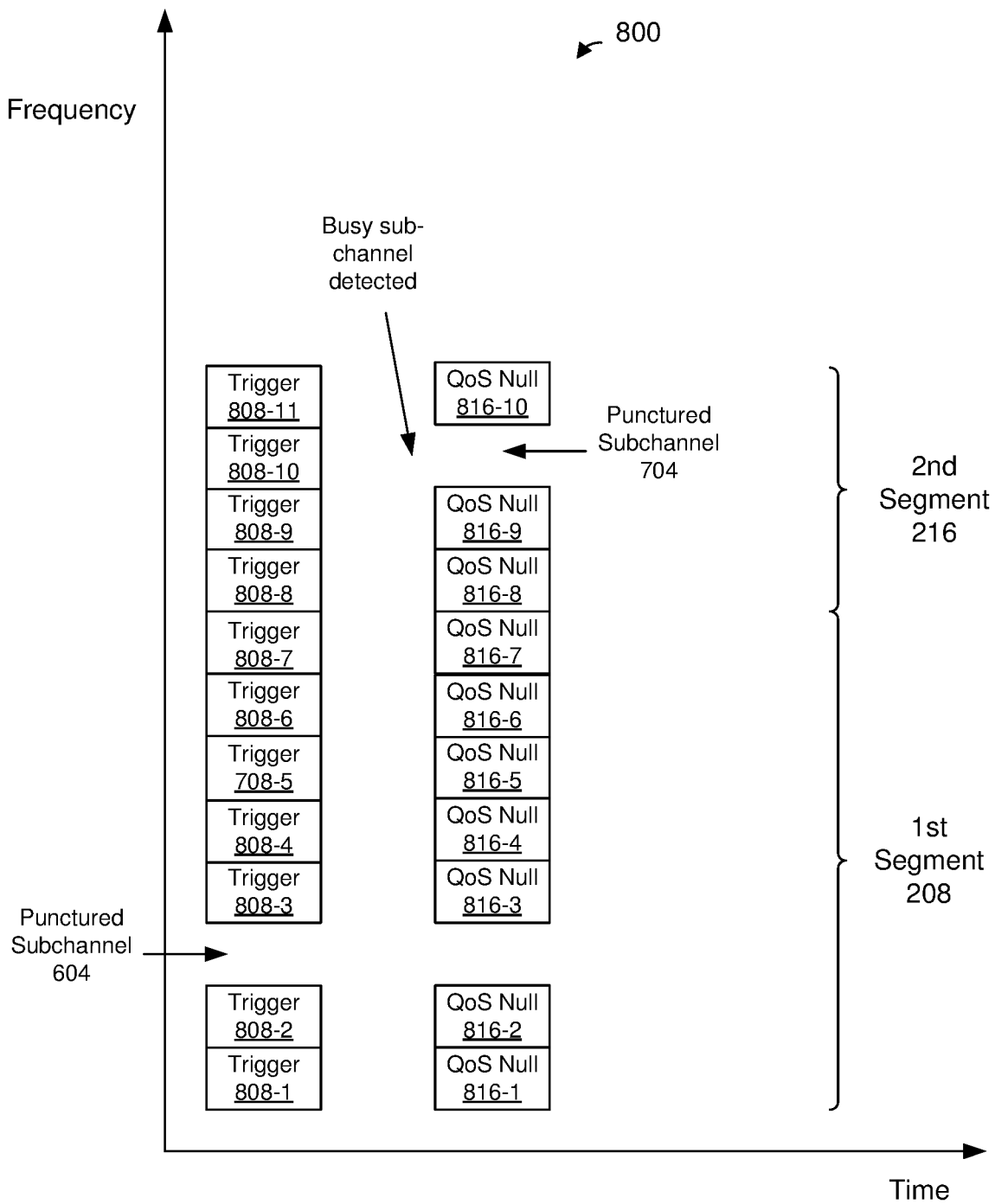
FIG. 8 is a diagram of another example frame exchange for negotiating a communication channel such as shown in FIGS. 2A-C, according to another embodiment.

FIG. 8 is a diagram of an example exchange 800 for negotiating a communication channel to use for a TXOP, according to another embodiment. The exchange 800 is similar to the RTS/CTS exchange 700 of FIG. 7, and like numbered elements are not discussed in detail for brevity.

In other embodiments, each of the RTS frames 608 and the CTS frames 616 are transmitted in suitable PPDU, such as a non-legacy PPDU.

Instead of transmitting RTS frames 608, the first communication devices transmits trigger frames 808. The trigger frames 808 are configured to prompt the second communication device to transmit quality of service (QoS) Null frames 816. Each QoS Null frame 816 includes a MAC header (e.g., the MAC header 504, the MAC header 554, or another suitable MAC header) but does not include a MAC data portion.

As in RTS/CTS exchanges 700 of FIG. 7, the second communication device determines that one of the subchannels in the second segment 216 is not idle. Because the one subchannel in the second segment 216 is not idle, the second communication device transmits QoS Null frames 816 in the remaining subchannels of the second segment 216.

The trigger frames 808 are transmitted in packets such as described with reference to FIG. 3B or 4, or in other suitable packets, according to various embodiments. In some embodiments, trigger frames 808 transmitted in the first segment 208 are transmitted in packets that include a service field with a bandwidth indicator indicating the first frequency segment 208, and trigger frames 808 transmitted in the second segment 216 are transmitted in packets that include a service field with a bandwidth indicator indicating the second frequency segment 216. In some embodiments, trigger frames 808 transmitted in the first segment 208 are transmitted in packets that include a signal field with a bandwidth indicator indicating the first frequency segment 208, and trigger frames 808 transmitted in the second segment 216 are transmitted in packets that include a signal field with a bandwidth indicator indicating the second frequency segment 216.

In some embodiments, the trigger frames 808 include an indicator of punctured subchannel(s) in the overall communication channel. For example, in some embodiments, all of the trigger frames 808 include a bitmap corresponding to the overall communication channel, the bitmap indicating the subchannel 604 is punctured. In other embodiments, trigger frames 808 transmitted in the first segment 208 include a bitmap corresponding to the first segment 208 that indicates the subchannel 604 is punctured, and trigger frames 808 transmitted in the second segment 216 include a bitmap corresponding to the second segment 216.

In response to receiving the trigger frames 808, the second communication device determines whether subchannels in which the second communication device received trigger frames 808 are idle, and transits QoS Null frames 816 in any subchannels that are determined to be idle.

The QoS Null frames 816 are transmitted in packets such as described with reference to FIG. 3B or 4, or in other suitable packets, according to various embodiments. Similar to the RTS/CTS exchange 700 of FIG. 7, QoS Null frames 816 transmitted in the first segment 208 are transmitted in packets that include a service field (or a signal field) with a bandwidth indicator indicating the first frequency segment 208, and QoS Null frames 816 transmitted in the second segment 216 are transmitted in packets that include a service field (or a signal field) with a bandwidth indicator indicating the second frequency segment 216.

In some embodiments, the QoS Null frames 816 include an indicator of punctured subchannel(s) in the overall communication channel. For example, in some embodiments, all of the QoS Null frames 816 include a bitmap corresponding to the overall communication channel, the bitmap indicating the subchannel 604 and the subchannel 704 are punctured. In other embodiments, QoS Null frames 816 transmitted in the first segment 208 include a bitmap corresponding to the first segment 208 that indicates the subchannel 604 is punctured, and QoS Null frames 816 transmitted in the second segment 216 include a bitmap corresponding to the second segment 216 that indicates the subchannel 704 is punctured.

In some embodiments, the QoS Null frames 816 do not include a bandwidth indicator such as described above and/or do not include an indicator of punctured subchannels as described above.

The subchannels in which QoS Null frames 816 are transmitted establish the subchannels to be used for the TXOP, according to an embodiment. In other embodiments in which the QoS Null frames 816 include indications of punctured channel(s), if any, the indications of punctured channel(s), if any, in the QoS Null frames 816 additionally or alternatively establish the subchannels to be used for the TXOP.

In some embodiments, each of the trigger frames 808 and the QoS Null frames 816 are transmitted in a non-HT PPDU. Trigger frames 808 in the first segment 208 are included in non-HT duplicate PPDUs and transmitted in each 20 MHz subchannel (except in any punctured subchannels) of the first segment 208. Similarly, trigger frames 808 in non-HT duplicate PPDUs are transmitted in each 20 MHz subchannel (except in any punctured subchannels) of the second segment 216. QoS Null frames 816 are similarly transmitted in non-HT duplicate PPDUs, according to some embodiments.

In other embodiments, each of the trigger frames 808 and the QoS Null frames 816 are transmitted in other suitable PPDUs, such as a non-legacy PPDU.

In various embodiments, a bandwidth indicator for a frequency segment such as described above includes i) a width indicator that indicates width, in frequency, of the frequency segment, and ii) a starting subchannel indicator that indicates a lowest (in frequency) subchannel of the frequency segment. In various other embodiments, a bandwidth indicator for a frequency segment such as described above includes i) a width indicator that indicates width, in frequency, of the frequency segment, and ii) a center frequency indicator that indicates a center frequency of the frequency segment.

In some embodiments, an indicator of punctured channels (if any) for a communication channel such as described above includes an 16-bit bitmap, where each bit of the bitmap corresponds to a respective 20 MHz subchannel among a set of up to sixteen subchannels. In some embodiments, an indicator of punctured channels (if any) for a frequency segment such as described above includes an 8-bit bitmap, where each bit of the bitmap corresponds to a respective 20 MHz subchannel among a set of up to eight subchannels. In some embodiments, an indicator of punctured channels (if any) for a communication channel such as described above includes an 8-bit bitmap, where each bit of the bitmap corresponds to a respective 40 MHz subchannel (e.g., a respective pair of adjacent 20 MHz subchannels) among a set of up to eight 40 MHz subchannels.

Figure 9:
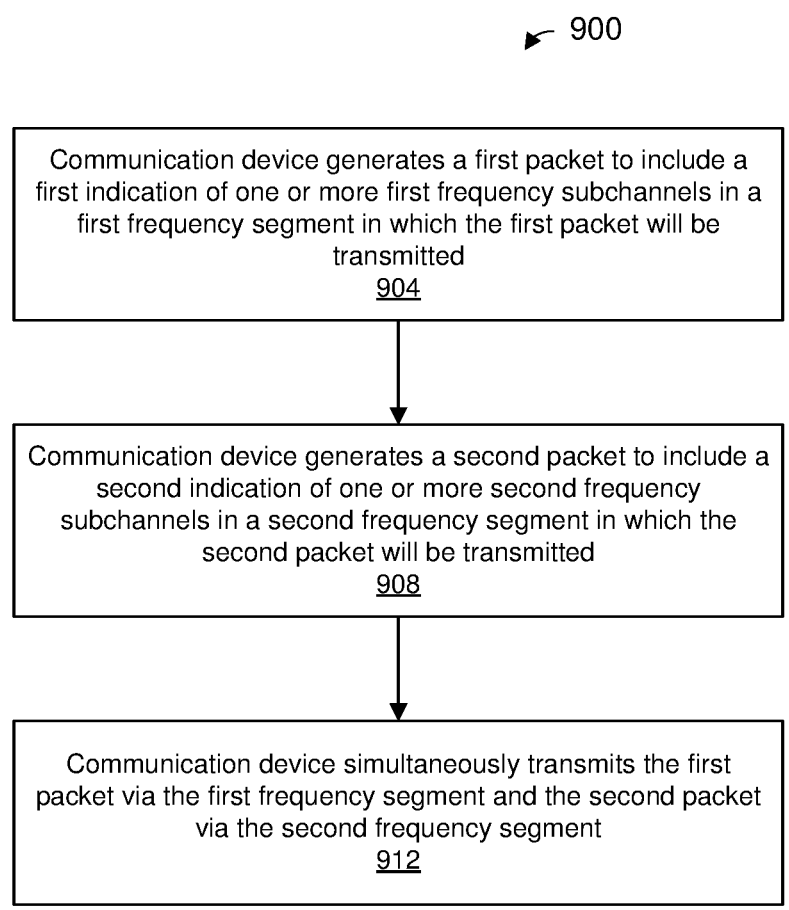
FIG. 9 is a flow diagram of an example method for communicating information regarding a communication channel such as shown in FIGS. 2A-C, according to an embodiment.

FIG. 9 is a flow diagram of an example method 900 for communicating information regarding a communication channel that comprises multiple frequency segments, according to an embodiment. The method 900 is implemented by a wireless communication device such as any of the communication devices of FIG. 1, or another suitable wireless communication device. The method 900 is described with reference to FIG. 1 for ease of explanation. In other embodiments, however, the method 900 is implemented by another suitable communication device having a suitable structure different than the communication devices of FIG. 1.

In various embodiments, the method 900 is performed in the context of the example communication channels described above with reference to FIGS. 2A-C. In other embodiments, the method 900 is performed in the context of other suitable communication channels that comprise multiple frequency segments.

In various embodiments, the method 900 is performed in the context of packets described above with reference to FIGS. 3B and 4. In other embodiments, the method 900 is performed in the context of other suitable packets.

In various embodiments, the method 900 is performed in the context of MAC layer data units and/or frame exchanges described above with reference to FIGS. 5A-B and 6-8. In other embodiments, the method 900 is performed in the context of other suitable MAC layer data units.

At block 904, at a communication device generates (e.g., the network interface device 122 generates, the PHY processor 130 generates, etc.) a first packet to include a first indication of one or more first frequency subchannels in a first frequency segment that will be utilized to transmit the first packet.

At block 908, the communication device generates (e.g., the network interface device 122 generates, the PHY processor 130 generates, etc.) a second packet to include a second indication of one or more second frequency subchannels in a second frequency segment that will be utilized to transmit the second packet.

In some embodiments, generating the first packet at block 904 comprises generating the first packet to include a first indication of the first frequency segment; and generating the second packet at block 908 comprises generating the second packet to include a second indication of the second frequency segment.

In some embodiments, generating the first packet at block 904 comprises generating the first packet to include a first service field that includes the first indication of the first frequency segment, the first service field within a first PHY data portion of the first packet; and generating the second packet at block 908 comprises generating the second packet to include a second service field that includes the second indication of the second frequency segment, the second service field within a second PHY data portion of the second packet.

In some embodiments, generating the first packet at block 904 comprises generating the first packet to include a first signal field that includes the first indication of the first frequency segment, the first signal field within a first PHY header of the first packet, and generating the second packet at block 908 comprises generating the second packet to include a second signal field that includes the second indication of the second frequency segment, the second signal field within a second PHY header of the second packet.

At block 912, the communication device simultaneously transmits (e.g., the network interface device 122 transmits, the PHY processor 130 transmits, etc.) the first packet via the first frequency segment and the second packet via the second frequency segment.

In some embodiments, the method 900 further comprises: generating the first packet to include a bitmap that indicates the one or more first frequency subchannels within the first frequency segment and the one or more second frequency subchannels within the second frequency segment; and generating the second packet to include the bitmap.

In some embodiments, the method 900 further comprises: generating the bitmap, wherein respective bits of the bitmap correspond to respective 20 MHz subchannels of a communication channel that includes the first frequency segment and the second frequency segment.

In some embodiments, the method 900 further comprises: generating the bitmap, wherein respective bits of the bitmap correspond to respective 40 MHz subchannels of a communication channel that includes the first frequency segment and the second frequency segment.

In some embodiments, the method 900 further comprises: generating a first MAC data unit to include the bitmap; generating the first packet to include the first MAC data unit; generating a second MAC data unit to include the bitmap; and generating the second packet to include the second MAC data unit.

In some embodiments, the method 900 further comprises: generating the first packet to include a first bitmap that indicates the one or more first frequency subchannels within the first frequency segment; and generating the second packet to include a second bitmap that indicates the one or more second frequency subchannels within the second frequency segment.

In some embodiments, the method 900 further comprises: generating the first packet to include one or more first RTS frames corresponding to the first frequency segment; and generating the second packet to include one or more second RTS frames corresponding to the first frequency segment.

In some embodiments, the method 900 further comprises: generating the first packet to include one or more first trigger frames corresponding to the first frequency segment, the one or more first trigger frames configured to prompt another communication device to transmit channel availability information regarding the first frequency segment; and generating the second packet to include one or more second trigger frames corresponding to the second frequency segment, the one or more second trigger frames configured to prompt the other communication device to transmit channel availability information regarding the second frequency segment.

FIG. 10A is a diagram of an example signal field, or a portion of a signal field, 1000 that is transmitted in a particular frequency segment of a communication channel that comprises multiple frequency segments, according to some embodiments. The portion of the signal field 1000 is used as the portion of the signal field 340 of FIG. 3A, in some embodiments. The signal field 1000 is used as the signal field 384/394 of FIG. 3B, in other embodiments. The signal field 1000 is included in a PHY header of a packet. For ease of explanation, the signal field (or portion of signal field) 1000 is referred to herein as "the signal field 1000".

The signal field 1000 includes a bandwidth indicator subfield 1004 that indicates a bandwidth of the frequency segment in which the signal field 1000 is transmitted, according to an embodiment. The signal field 1000 additionally includes a center frequency indicator subfield 1008 that indicates a center frequency of the frequency segment in which the signal field 1000 is transmitted, according to an embodiment. In another embodiment, the center frequency indicator subfield 1008 is replaced with a start subchannel indicator subfield that indicates a lowest (in frequency) subchannel of the frequency segment which the signal field 1000 is transmitted. Together, the bandwidth indicator subfield 1004 and the center frequency indicator (or start subchannel indicator) subfield 1008 indicate one or more subchannels in which the signal field 1000 is transmitted.

The signal field 1000 additionally includes a punctured channel indicator subfield 1012 that indicates which subchannel(s) (if any) in the frequency segment are punctured, according to an embodiment. In some embodiments, the punctured channel indicator subfield 1012 indicates which subchannel(s) (if any) in an overall channel (which includes the frequency segment and one or more other frequency segments) are punctured. In an embodiment, the punctured channel indicator subfield 1012 includes a bitmap that consists of eight bits corresponding to eight respective 20 MHz subchannels, up to eight of which may be included in the frequency segment. In another embodiment, the punctured channel indicator subfield 1012 includes a bitmap that consists of sixteen bits corresponding to sixteen respective 20 MHz subchannels, up to sixteen of which may be included in an overall channel (which includes the frequency segment and one or more other frequency segments). In another embodiment, the punctured channel indicator subfield 1012 includes a bitmap that consists of eight bits corresponding to eight respective 40 MHz subchannels, up to eight of which may be included in an overall channel (which includes the frequency segment and one or more other frequency segments).

The signal field 1000 additionally includes a duration indicator subfield 1016 that indicates a duration of a packet within the frequency segment, the packet including the signal field 1000, according to an embodiment.

In some embodiments, the signal field 1000 additionally includes a spectrum segment ID subfield 1020 that indicates a spectrum segment in which the signal field 1000 is transmitted.

In various embodiments, one of, or any suitable combination of two or more of, the bandwidth indicator subfield 1004, the center frequency (or start subchannel) indicator subfield 1008, the punctured subchannel indictor subfield 1012, the duration indicator subfield 1016, and the spectrum segment ID subfield 1020 are omitted from the signal field 1000.

FIG. 10B is a diagram of an example service field 1030 that is transmitted in a particular frequency segment of a communication channel that comprises multiple frequency segments, according to some embodiments. The service field 1030 is used as the service field 434/438 of FIG. 4, in some embodiments.

In various embodiments, the service field 1030 includes one of, or any suitable combination of two or more of, the bandwidth indicator subfield 1004, the center frequency (or start subchannel) indicator subfield 1008, the punctured subchannel indictor subfield 1012, the duration indicator subfield 1016, and the spectrum segment ID subfield 1020 discussed above with reference to FIG. 10A.

Figure 10C:
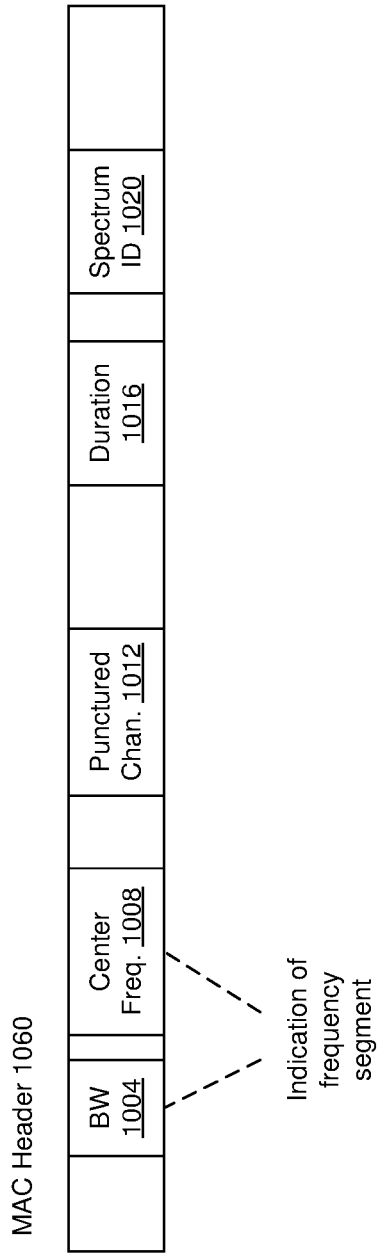
FIG. 10C is a diagram of an example media access control (MAC) layer header of a packet, according to an embodiment.

FIG. 10C is a diagram of an example MAC header 1060 that is transmitted in a particular frequency segment of a communication channel that comprises multiple frequency segments, according to some embodiments. The MAC header 1060 is used as the MAC header 504 of FIG. 5A, in some embodiments.

In various embodiments, the MAC header 1060 includes one of, or any suitable combination of two or more of, the bandwidth indicator subfield 1004, the center frequency (or start subchannel) indicator subfield 1008, the punctured subchannel indictor subfield 1012, the duration indicator subfield 1016, and the spectrum segment ID subfield 1020 discussed above with reference to FIG. 10A.

The MAC header 1060 is part of a MAC frame that includes the RTS frame 608 of FIGS. 6 and 7, according to some embodiments. In other embodiments, the RTS frame 608 of FIGS. 6 and 7 does not include the MAC header 1060. The MAC header 1060 is part of a MAC frame that includes the CTS frame 616 of FIGS. 6 and 7, according to some embodiments. In other embodiments, the CTS frame 616 of FIGS. 6 and 7 does not include the MAC header 1060. The MAC header 1060 is part of a MAC frame that includes the trigger frame 808 of FIG. 8, according to some embodiments. In other embodiments, the trigger frame 808 of FIG. 8 does not include the MAC header 1060. The MAC header 1060 is included in the QoS Null frame 816 of FIG. 8, according to some embodiments. In other embodiments, the QoS Null frame 816 of FIG. 8 does not include the MAC header 1060.

Figure 10D:
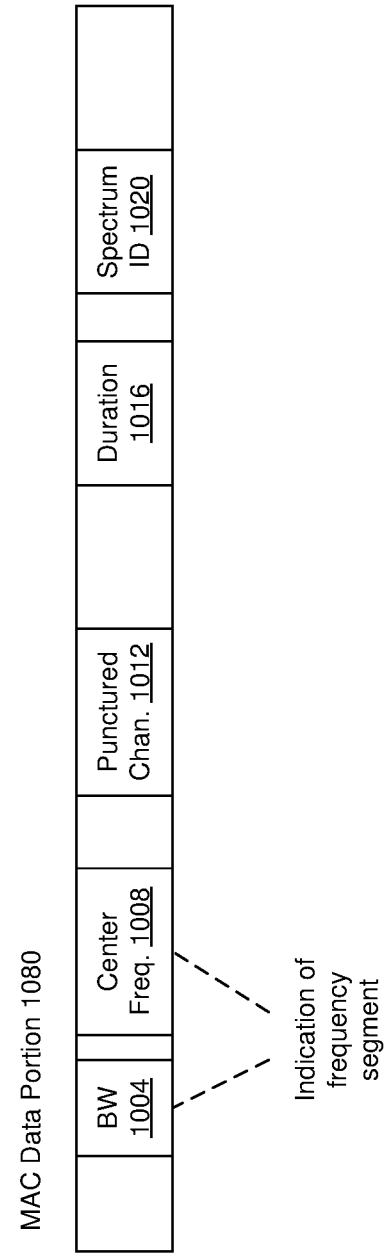
FIG. 10D is a diagram of an example MAC layer data portion of a packet, according to an embodiment.

FIG. 10D is a diagram of an example MAC data portion 1080 that is transmitted in a particular frequency segment of a communication channel that comprises multiple frequency segments, according to some embodiments. The MAC data portion 1080 is used as the MAC data portion 558 of FIG. 5B, in some embodiments.

In various embodiments, the MAC header portion 1080 includes one of, or any suitable combination of two or more of, the bandwidth indicator subfield 1004, the center frequency (or start subchannel) indicator subfield 1008, the punctured subchannel indictor subfield 1012, the duration indicator subfield 1016, and the spectrum segment ID subfield 1020 discussed above with reference to FIG. 10A.

The MAC data portion 1080 includes the RTS frame 608 of FIGS. 6 and 7, according to some embodiments. In other embodiments, the RTS frame 608 of FIGS. 6 and 7 is not part of the MAC data portion 1080. The MAC data portion 1080 includes the CTS frame 616 of FIGS. 6 and 7, according to some embodiments. In other embodiments, the CTS frame 616 of FIGS. 6 and 7 is not part of the MAC data portion 1080. The MAC data portion 1080 includes the trigger frame 808 of FIG. 8, according to some embodiments. In other embodiments, the trigger frame 808 of FIG. 8 is not part of the MAC data portion 1080.

In various embodiments, a packet includes i) the signal field 1000 (FIG. 10A) and/or the service field 1030 (FIG. 10B) and ii) the MAC header 1060 and/or the MAC data portion 1080, and the signal field 1000 (FIG. 10A) and/or the service field 1030 (FIG. 10B) includes one or more of the bandwidth indicator subfield 1004, the center frequency (or start subchannel) indicator subfield 1008, the punctured subchannel indictor subfield 1012, the duration indicator subfield 1016, and the spectrum segment ID subfield 1020, and the MAC header 1060 and/or the MAC data portion 1080 include one or more of the bandwidth indicator subfield 1004, the center frequency (or start subchannel) indicator subfield 1008, the punctured subchannel indictor subfield 1012, the duration indicator subfield 1016, and the spectrum segment ID subfield 1020.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously transmitting in multiple frequency segments in a wireless local area network (WLAN), the method comprising:
generating, at a communication device, a first packet to include i) a first indication of a first frequency segment that will be utilized to transmit the first packet and ii) a first bitmap having first bits corresponding to respective first frequency subchannels within the first frequency segment, wherein each first bit set to a particular bit value indicates nothing will be transmitted by the communication device in the corresponding first frequency subchannel when transmitting the first packet;
generating, at the communication device, a second packet to include i) a second indication of a second frequency segment that will be utilized to transmit the second packet and ii) a second bitmap having second bits corresponding to respective second frequency subchannels within the second frequency segment, wherein each second bit set to the particular bit value indicates nothing will be transmitted by the communication device in the corresponding second frequency subchannel when transmitting the second packet; and
simultaneously transmitting, by the communication device, the first packet via the first frequency segment and the second packet via the second frequency segment, including not transmitting in any first frequency subchannels corresponding to first bits in the first bitmap set to the particular bit value, and not transmitting in any second frequency subchannels corresponding to second bits in the second bitmap set to the particular bit value.

2. The method of claim 1, wherein:
generating the first packet to include the first indication of the first frequency segment comprises generating the first packet to include a first service field that includes the first indication of the first frequency segment, the first service field within a first physical layer (PHY) data portion of the first packet; and
generating the second packet to include the second indication of the second frequency segment comprises generating the second packet to include a second service field that includes the second indication of the second frequency segment, the second service field within a second PHY data portion of the second packet.

3. The method of claim 1, wherein:
generating the first packet to include the first indication of the first frequency segment comprises generating the first packet to include a first signal field that includes the first indication of the first frequency segment, the first signal field within a first physical layer (PHY) header of the first packet; and
generating the second packet to include the second indication of the second frequency segment comprises generating the second packet to include a second signal field that includes the second indication of the second frequency segment, the second signal field within a second PHY header of the second packet.

4. The method of claim 1, further comprising:
generating the first bitmap, wherein respective bits of the first bitmap correspond to respective 20 MHz subchannels within the first frequency segment; and
generating the second bitmap, wherein respective bits of the second bitmap correspond to respective 20 MHz subchannels within second frequency segment.

5. The method of claim 1, further comprising:
generating the first bitmap, wherein respective bits of the bitmap correspond to respective 40 MHz subchannels within the first frequency segment; and
generating the second bitmap, wherein respective bits of the second bitmap correspond to respective 40 MHZ subchannels with the second frequency segment.

6. The method of claim 5, further comprising:
generating a first media access control (MAC) data unit to include the first bitmap;
generating the first packet to include the first MAC data unit;
generating a second MAC data unit to include the second bitmap; and
generating the second packet to include the second MAC data unit.

7. The method of claim 1, further comprising:
generating the first packet to include one or more first request-to-send (RTS) frames corresponding to the first frequency segment; and
generating the second packet to include one or more second RTS frames corresponding to the first frequency segment.

8. The method of claim 1, further comprising:
generating the first packet to include one or more first trigger frames corresponding to the first frequency segment, the one or more first trigger frames configured to prompt another communication device to transmit channel availability information regarding the first frequency segment; and
generating the second packet to include one or more second trigger frames corresponding to the second frequency segment, the one or more second trigger frames configured to prompt the other communication device to transmit channel availability information regarding the second frequency segment.

9. A communication device, comprising:
a wireless network interlace device having one or more integrated circuit (IC) devices configured to:
generate a first packet to include i) a first indication of a first frequency segment that will be utilized to transmit the first packet and ii) a first bitmap having first bits corresponding to respective first frequency subchannels within the first frequency segment, wherein each first bit set to a particular bit value indicates nothing will be transmitted by the communication device in the corresponding first frequency subchannel when transmitting the first packet,
generate a second packet to include i) a second indication of a second frequency segment that will be utilized to transmit the second packet and ii) a second bitmap having second bits corresponding to respective second frequency subchannels within the second frequency segment, wherein each second bit set to the particular bit value indicates nothing will be transmitted by the communication device in the corresponding second frequency subchannel when transmitting the second packet, and
control the wireless network interlace device to simultaneously transmit the first packet via the first frequency segment and the second packet via the second frequency segment, including not transmitting in any first frequency subchannels corresponding to first bits in the first bitmap set to the particular bit value, and not transmitting in any second frequency subchannels corresponding to second bits in the second bitmap set to the particular bit value.

10. The communication device of claim 9, wherein the one or more IC devices are further configured to:

generate the first packet to include a first service field that includes the first indication of the first frequency segment, the first service field within a first physical layer (PHY) data portion of the first packet; and generate the second packet to include a second service field that includes the second indication of the second frequency segment, the second service field within a second PHY data portion of the second packet.

11. The communication device of claim 9, wherein the one or more IC devices are further configured to:

generate the first packet to include a first signal field that includes the first indication of the first frequency segment, the first signal field within a first physical layer (PHY) header of the first packet; and generate the second packet to include a second signal field that includes the second indication of the second frequency segment, the second signal field within a second PHY header of the second packet.

12. The communication device of claim 9, wherein the one or more IC devices are further configured to:

generate the first bitmap, wherein respective bits of the first bitmap correspond to respective 20 MHz subchannels within the first frequency segment; and generate the second bitmap, wherein respective bits of the second bitmap correspond to respective 20 MHz subchannels within the second frequency segment.

13. The communication device of claim 9, wherein the one or more IC devices are further configured to:

generate the first bitmap, wherein respective bits of the first bitmap correspond to respective 40 MHz subchannels within the first frequency segment, and generate the second bitmap, wherein respective bits of the second bitmap correspond to respective 40 MHz subchannels within the second frequency segment.

14. The communication device of claim 4, wherein the one or more IC devices are further configured to:

generate a first media access control (MAC) data unit to include the first bitmap;

generate the first packet to include the first MAC data unit;

generate a second MAC data unit to include the second bitmap; and generate the second packet to include the second MAC data unit.

15. The communication device of claim 12, wherein the one or more IC devices are further configured to:

generate the first packet to include one or more first request-to-send (RTS) frames corresponding to the first frequency segment; and generate the second packet to include one or more second RTS frames corresponding to the first frequency segment.

16. The communication device of claim 12, wherein the one or more IC devices are further configured to:

generate the first packet to include one or more first trigger frames corresponding to the first frequency segment, the one or more first trigger frames configured to prompt another communication device to transmit channel availability information regarding the first frequency segment; and generate the second packet to include one or more second trigger frames corresponding to the second frequency segment, the one or more second trigger frames configured to prompt the other communication device to transmit channel availability information regarding the second frequency segment.

* * * * *